US011874620B2

(12) United States Patent
Fujiwara

(10) Patent No.: US 11,874,620 B2
(45) Date of Patent: Jan. 16, 2024

(54) FIXING DEVICE AND IMAGE FORMING APPARATUS INCORPORATING SAME

(71) Applicant: Hitoshi Fujiwara, Kanagawa (JP)

(72) Inventor: Hitoshi Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/978,993

(22) Filed: Nov. 2, 2022

(65) Prior Publication Data

US 2023/0221664 A1 Jul. 13, 2023

(30) Foreign Application Priority Data

Jan. 12, 2022 (JP) ................................ 2022-002918

(51) Int. Cl.
*G03G 15/20* (2006.01)

(52) U.S. Cl.
CPC ..... *G03G 15/2053* (2013.01); *G03G 15/2032* (2013.01); *G03G 15/206* (2013.01); *G03G 2215/2035* (2013.01)

(58) Field of Classification Search
CPC .......... G03G 15/2053; G03G 15/2032; G03G 2215/2035; G03G 15/206
See application file for complete search history.

(56) References Cited

U.S. PATENT DOCUMENTS

| | | | | |
|---|---|---|---|---|
| 5,331,385 A * | 7/1994 | Ohtsuka | G03G 15/206 399/331 |
| 2006/0067750 A1* | 3/2006 | Inoue | G03G 15/206 399/328 |
| 2021/0278790 A1 | 9/2021 | Furuichi et al. | |
| 2022/0179338 A1 | 6/2022 | Seshita et al. | |
| 2022/0283530 A1 | 9/2022 | Adachi et al. | |
| 2022/0291610 A1 | 9/2022 | Seki et al. | |

FOREIGN PATENT DOCUMENTS

| | | |
|---|---|---|
| JP | 2002-162857 | 6/2002 |
| JP | 2008-268629 | 11/2008 |
| JP | 2014-026243 | 2/2014 |
| JP | 2020-052345 | 4/2020 |

* cited by examiner

*Primary Examiner* — Sandra Brase
(74) *Attorney, Agent, or Firm* — XSENSUS LLP

(57) ABSTRACT

A fixing device includes a first rotator, a second rotator, a heater, a conductor, and a discharger. The first rotator includes a conductive first layer, a non-conductive second layer, and a conductive third layer. The first to third layers exist in an order of the first layer to the third layer from a center of the first rotator to an outside of the first rotator. The second rotator forms a nip between the first rotator and the second rotator. A recording medium bearing a toner image passes through the nip. The heater is disposed inside a loop of the second rotator and heats the second rotator. The conductor is in contact with one of the first layer and the third layer. The discharger is in contact with the conductor and the other one of the first layer and the third layer and removes electric charge from the first rotator.

20 Claims, 22 Drawing Sheets

FIXING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2022-002918, filed on Jan. 12, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

A fixing device in an image forming apparatus includes a pressure roller as a first rotator. The pressure roller includes, for example, a core as a first layer, an elastic layer as a second layer layered on the core, and a surface layer as a third layer layered on the elastic layer. The elastic layer of the pressure roller is made of a non-conductive material to obtain elasticity and expansibility.

SUMMARY

This specification describes an improved fixing device that includes a first rotator, a second rotator, a heater, a conductor, and a discharger. The first rotator includes a first layer being electrically conductive, a second layer not being electrically conductive, and a third layer being electrically conductive. The first layer, the second layer, and the third layer exists in an order of the first layer, the second layer, and the third layer from a center of the first rotator to an outside of the first rotator. The second rotator forms a nip between the first rotator and the second rotator. A recording medium bearing a toner image passes through the nip. The heater is disposed inside a loop of the second rotator and heats the second rotator. The conductor is in contact with one of the first layer and the third layer. The discharger is in contact with the conductor and the other one of the first layer and the third layer and removes electric charge from the first rotator.

This specification also describes an improved fixing device that includes a first rotator, a second rotator, a heater, a conductor, and a discharger. The first rotator includes a first layer being electrically conductive, a second layer not being electrically conductive, and a third layer being electrically conductive. The first layer, the second layer, and the third layer exists in an order of the first layer, the second layer, and the third layer from a center of the first rotator to an outside of the first rotator. The second rotator forms a nip between the first rotator and the second rotator. A recording medium bearing a toner image passes through the nip. The heater is disposed inside a loop of the second rotator and heats the second rotator. The conductor is in contact with the first layer. The discharger is in contact with the conductor and a surface layer of the second rotator and removes electric charge from the first rotator.

This specification further describes an improved fixing device that includes a first rotator, a second rotator, a heater, a conductor, and a discharger. The first rotator includes a first layer being electrically conductive, a second layer not being electrically conductive, and a third layer being electrically conductive. The first layer, the second layer, and the third layer exists in an order of the first layer, the second layer, and the third layer from a center of the first rotator to an outside of the first rotator. The second rotator forms a nip between the first rotator and the second rotator. A recording medium bearing a toner image passes through the nip. The heater is disposed inside a loop of the second rotator and heats the second rotator. The conductor is in contact with the first layer and the third layer. The discharger is in contact with at least one of the first layer, the third layer, the conductor, and a surface layer of the second rotator.

This specification still further describes an image forming apparatus including the fixing device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
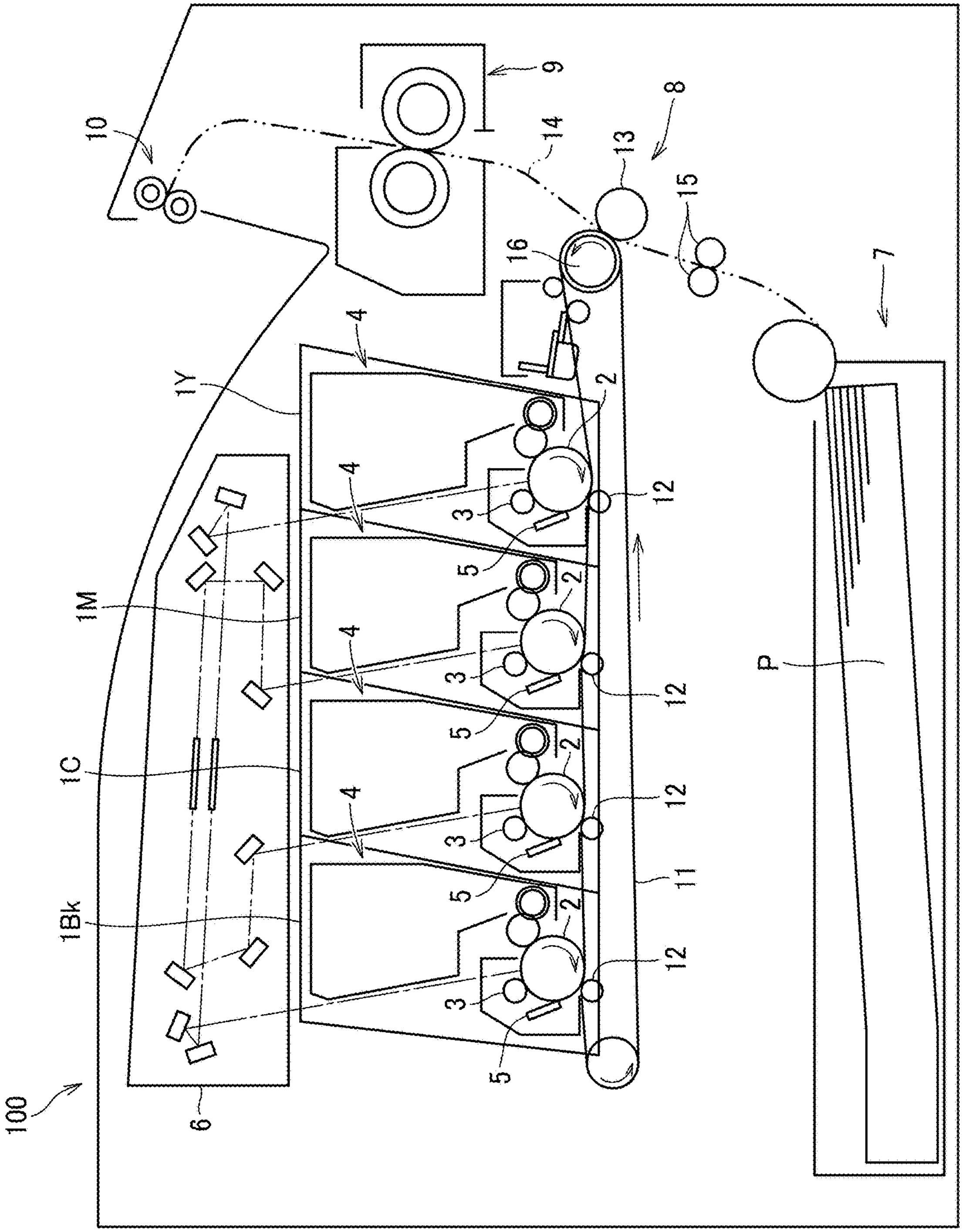
FIG. 1 is a schematic sectional view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Referring to the attached drawings, the following describes embodiments of the present disclosure. In the drawings for illustrating embodiments of the present disclosure, identical reference numerals are assigned to elements such as members and parts that have an identical function or an identical shape as long as differentiation is possible, and descriptions of such elements may be omitted once the description is provided.

FIG. 1 is a schematic sectional view of a configuration of an image forming apparatus 100 according to the embodiment of the present disclosure. The image forming apparatus 100 according to the present embodiment includes a fixing device as an example of a heating device of the present disclosure. The fixing device fixes a toner image on a sheet onto the sheet.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form the toner image. The cleaning device 5 cleans the surface of the photoconductor 2.

The image forming apparatus 100 includes an exposure device 6, a sheet feeder 7, a transfer device 8, a fixing device 9 as a heating device, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk, photoconductors 2, the charging devices 3, the exposure device 6, the transfer device 8, and the like configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2. The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from the terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. Thus, the full color toner image is transferred onto and borne on the sheet P. After the toner image is transferred from each of the photoconductors 2 onto the intermediate transfer belt 11, each of cleaning devices 5 removes residual toner on each of the photoconductors 2.

The sheet P transferred with the full color toner image is conveyed to the fixing device 9 that fixes the full color toner image on the sheet P. Thereafter, the sheet ejection device 10 ejects the sheet P onto the outside of the image forming apparatus 100, thus finishing a series of printing processes.

Next, a configuration of the fixing device 9 is described.

Figure 2:
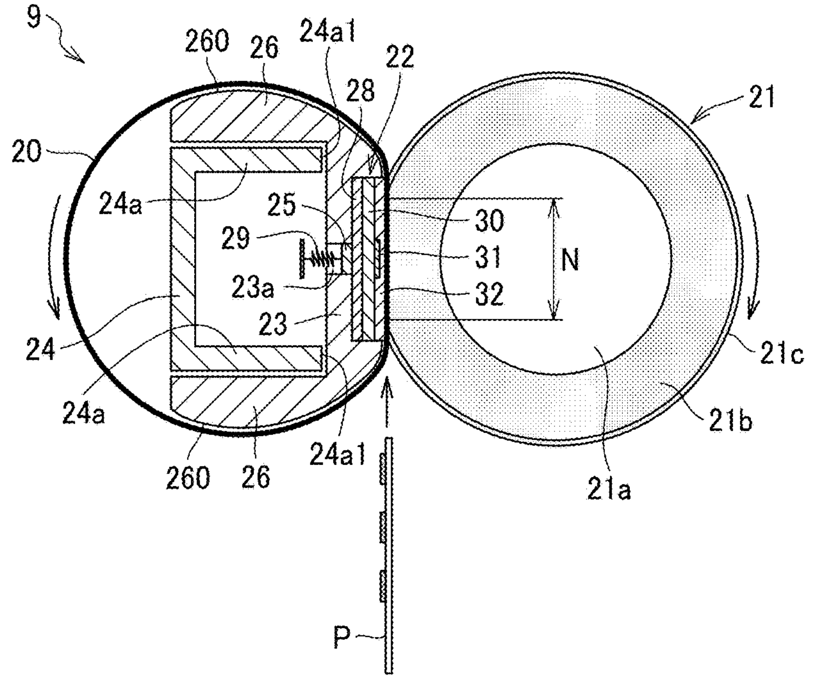
FIG. 2 is a schematic sectional side view of a fixing device incorporated in the image forming apparatus of FIG. 1.

As illustrated in FIG. 2, the fixing device 9 according to the present embodiment includes a fixing belt 20, a pressure roller 21, a heater 22 as a heating member, a heater holder 23 as a holder, a stay 24 as a support, a thermistor 25 as a temperature detector, and a first high thermal conduction member 28. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 detects the temperature of the first high thermal conduction member 28.

The fixing belt 20, the pressure roller 21, the heater 22, the heater holder 23, the stay 24, and the first high thermal conduction member 28 extend in a direction perpendicular to the sheet surface of FIG. 2. Hereinafter, the direction is simply referred to as a longitudinal direction. Note that the longitudinal direction is also a width direction of the sheet P conveyed, a belt width direction of the fixing belt 20, and an axial direction of the pressure roller 21. A pressure rotator disposed in the fixing device is an example of a first rotator disposed in the heating device of the present disclosure. The fixing device 9 in the present embodiment includes the pressure roller 21 as an example of the pressure rotator. A fixing rotator disposed in the fixing device is an example of a second rotator disposed in the heating device of the present disclosure. The fixing device 9 in the present embodiment includes the fixing belt 20 as an example of the fixing rotator.

The fixing belt 20 includes a tubular base that is made of polyimide (PI) and has an outer diameter of 25 mm and a thickness in a range of from 40 μm to 120 μm, for example. The fixing belt 20 further includes a release layer serving as an outermost surface layer. The release layer is made of fluororesin, such as tetrafluoroethylene-perfluoroalkylvinylether copolymer (PFA) and polytetrafluoroethylene (PTFE) and has a thickness in a range of from 5 μm to 50 μm to enhance durability of the fixing belt 20 and facilitate separation of the sheet P and a foreign substance from the fixing belt 20. An elastic layer made of rubber having a thickness of from 50 to 500 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or polytetrafluoroethylene (PTFE) as a slide layer.

The pressure roller 21 has an outer diameter of 25 mm, for example. The pressure roller 21 includes, for example, a core 21*a* as a first layer, an elastic layer 21*b* as a second layer layered on the core, and a surface layer 21*c* as a third layer layered on the elastic layer. The core 21*a* is a solid core metal made of a conductive material that is iron in the present embodiment. The elastic layer 21*b* is made of a non-conductive material that is silicone rubber in the present embodiment. The elastic layer 21*b* has a thickness of 3.5 mm. Forming the elastic layer 21*b* as a non-conductive layer does not need adding a material such as a filler to the elastic layer 21*b* for imparting conductivity to the elastic layer 21*b*, which is helpful to secure the elasticity and stretchability of the elastic layer 21*b*.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21 in a direction indicated by arrow in FIG. 2, and the rotation of the pressure roller 21 rotates the fixing belt 20.

The heater 22 is a planar heater extending in the longitudinal direction thereof parallel to the width direction of the fixing belt 20. The heater 22 includes a planar base 30, resistive heat generators 31 disposed on the base 30, and an insulation layer 32 covering the resistive heat generators 31. The insulation layer 32 of the heater 22 contacts the inner circumferential surface of the fixing belt 20, and the heat generated from the resistive heat generators 31 is transmitted to the fixing belt 20 through the insulation layer 32. The heater 22 may be covered with a conductor such as a sliding sheet, and the sliding sheet may contact the inner circumferential surface of the fixing belt 20. In the present disclosure, contact between the heater 22 and the inner circumferential surface of the fixing belt 20 may include contact between them via the conductor. A power supply 200 (see FIG. 16) applies an alternating current (AC) voltage to the heater 22, and the resistive heat generators 31 mainly generate heat. Although the resistive heat generators 31 and the insulation layer 32 are disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having the high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside the loop of the fixing belt 20. The stay 24 is configured by a channeled metallic member, and both side plates of the fixing device 9 support both end portions of the stay 24. Since the stay 24 supports the heater holder 23 and the heater 22, the heater 22 reliably receives a pressing force of the pressure roller 21 pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

When the stay 24 supports the heater holder 23, a surface of the heater holder 23 opposite the pressure roller 21 that is a left surface of the heater holder 23 in FIG. 2 contacts the stay 24 having a portion extending in the pressing direction of the pressure roller 21 (the lateral direction in FIG. 2) or a certain thick portion. Such a configuration reduces a bend of the heater holder 23 caused by the pressing force from the pressure roller 21, in particular, the bend in the longitudinal direction of the heater holder 23 in the present embodiment. However, the above-described contact includes not only the case where the stay 24 is in direct contact with the heater holder 23 but also the case where the stay 24 contacts the heater holder 23 via another member. The term "contact via another member" means a state in which another member is interposed between the stay 24 and the heater holder 23 in the lateral direction in FIG. 2, and at a position corresponding to at least a part of the member, the stay 24 contacts the member, and the member contacts the heater holder 23. The term "extending in the pressing direction" is not limited to a case where the portion of the stay 24 extends in the same direction as the pressing direction of the pressure roller 21 but includes the case where the portion of the stay 24 extends in a direction with a certain angle from the pressing direction of the pressure roller 21. Even in such cases, the stay 24 can reduce bending of the heater holder 23 under pressure from the pressure roller 21.

Since the heater holder 23 is subject to temperature increase by heat from the heater 22, the heater holder 23 is preferably made of a heat resistant material. The heater holder 23 made of heat-resistant resin having low thermal conduction, such as a liquid crystal polymer (LCP), reduces heat transfer from the heater 22 to the heater holder 23. Thus, the heater 22 can effectively heat the fixing belt 20.

In addition, the heater holder 23 includes guides 26 configured to guide the fixing belt 20. The guides 26 include upstream guides upstream from the heater 22 (that is under the heater 22 in FIG. 2) and downstream guides downstream from the heater 22 (that is over the heater 22 in FIG. 2) in a belt rotation direction. The upstream guides and the downstream guides of the guides 26 are disposed at intervals in a longitudinal direction of the heater 22. Each guide 26 has a substantial fan shape and has a belt facing surface 260. The belt facing surface 260 faces the inner circumferential surface of the fixing belt 20 and is an arc-shaped or convex curved surface extending in a belt circumferential direction.

The heater holder 23 has a plurality of openings 23*a* arranged in the longitudinal direction. The openings 23*a* extend through the heater holder 23 in the thickness direction thereof. The thermistor 25 and a thermostat which is described later are disposed in the openings 23*a*. Springs 29 press the thermistor 25 and the thermostat against the back surface of the first high thermal conduction member 28. However, the first high thermal conduction member 28 (and a second high thermal conduction member described later) may have openings similar to the openings 23*a*, and the springs 29 may press the thermistor 25 and the thermostat against the back surface of the base 30.

The first high thermal conduction member 28 is made of a material having a thermal conductivity higher than a thermal conductivity of the base 30. In the present embodiment, the first high thermal conduction member 28 is a plate made of aluminum. Alternatively, the first high thermal conduction member 28 may be made of copper, silver, graphene, or graphite, for example. The first high thermal conduction member 28 that is the plate can improve accuracy of positioning of the heater 22 with respect to the heater holder 23 and the first high thermal conduction member 28.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity was measured using a thermal diffusivity/conductivity measuring device (trade name: AI-PHASE MOBILE 1U, manufactured by Ai-Phase co., ltd.).

In order to convert the thermal diffusivity into thermal conductivity, values of density and specific heat capacity are necessary.

The density was measured by a dry automatic densitometer (trade name: ACCUPYC 1330 manufactured by Shimadzu Corporation).

The specific heat capacity was measured by a differential scanning calorimeter (trade name: DSC-60 manufactured by Shimadzu Corporation), and sapphire was used as a reference material in which the specific heat capacity is known. In the present embodiment, the specific heat capacity was measured five times, and an average value was calculated and used to obtain the thermal conductivity. A temperature condition was 50° C. The thermal conductivity λ is obtained by the following expression (1).

Expression (1)

$$\lambda=\rho\times C\times\alpha \quad (1)$$

where ρ is the density, C is the specific heat capacity, and α is the thermal diffusivity obtained by the thermal diffusivity measurement described above.

When the fixing device 9 according to the present embodiment starts printing, the pressure roller 21 is driven to rotate, and the fixing belt 20 starts to be rotated. The belt facing surface 260 of the guide 26 contacts and guides the inner circumferential surface of the fixing belt 20 to rotate the fixing belt 20 stably and smoothly. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N between the fixing belt 20 and the pressure roller 21, and the unfixed toner image is heated and pressed to be fixed to the sheet P. The fixing belt 20 is a heated member heated by the heater 22.

A certain amount of electric charge on the surface of the pressure roller 21 may move to the fixing belt 20. When the pressure roller 21 is charged to a polarity opposite to that of the toner on the sheet, a part of the toner on the sheet adheres to the surface of the fixing belt 20. After the toner adheres to the surface of the fixing belt 20, the adhered toner adheres to the sheet P passing through the fixing nip N. As a result, an image defect due to electrostatic offset occurs.

In addition, the pressure roller 21 in the present embodiment includes the elastic layer 21*b* that is a non-conductive layer between the core 21*a* and the surface layer 21*c*, and the core 21*a* and the surface layer 21*c* are conductive layers and not electrically connected. The core 21*a* is not in contact with any other conductive member and is not electrically connected to any other conductive member. An electric charge stored in the core 21*a* causes electrical noise.

Removing the electric charge from each of the core 21*a* and the surface layer 21*c* solves the above-described disadvantages. To remove the electric charge, a discharger may be in contact with the core 21*a*, and another discharger may be in contact with the surface layer 21*c*. However, the above-described configuration increases the number of components of the fixing device, resulting in an increase in cost and an increase in size of the fixing device. Alternatively, adding a conductive filler or the like to the elastic layer 21*b* between the core 21*a* and the surface layer 21*c* to form a conductive layer that electrically connects the core 21*a* and the surface layer 21*c*, and bringing the discharger into contact with either one of the core 21*a* and the surface layer 21*c* can remove the electric charge from each of the core 21*a* and the surface layer 21*c*. However, in this case, adding the conductive filler to the elastic layer 21*b* deteriorates the elasticity and stretchability of the elastic layer 21*b*. As a result, the pressure roller 21 needs to press the fixing belt 20 with a larger force in order to form the fixing nip N having a predetermined width, which causes another disadvantage such as an increase in size of the fixing device or breakage of the fixing belt 20.

Next, a configuration of the fixing device according to the present embodiment to remove the electric charge from each of the core 21*a* and the surface layer 21*c* is described with reference to FIG. 3.

Figure 3:
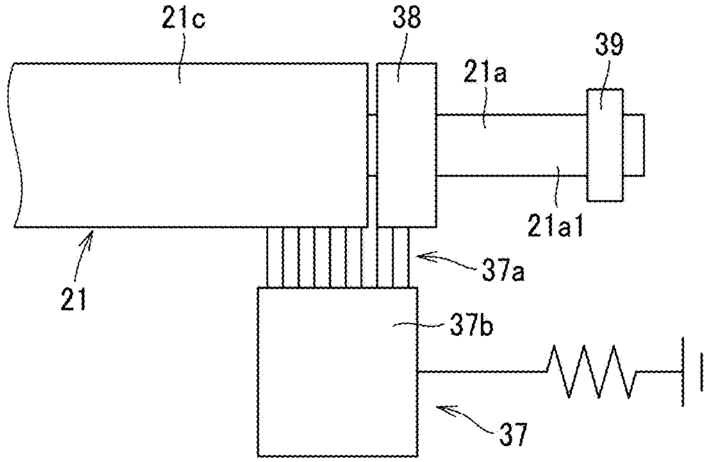
FIG. 3 is a plan view of a configuration including a discharging brush and a conductor to remove electric charge from a pressure roller in the fixing device of FIG. 2.

As illustrated in FIG. 3, the core 21*a* of the pressure roller 21 has an exposed portion 21*a*1. The exposed portion 21*a*1 protrudes from the surface layer 21*c* and the elastic layer in the axial direction of the pressure roller 21 and has an outer peripheral surface exposed to the outside of the pressure roller 21. In addition, the pressure roller 21 has a body. The body is a part of the pressure roller 21 other than the exposed portion 21*a*1, that is, the part including the elastic layer, the surface layer 21*c*, and a part of the core 21*a* other than the exposed portion 21*a*1.

In the present embodiment, the pressure roller 21 includes the core 21*a* as the first layer, the elastic layer 21*b* as the second layer (see FIG. 2), and the surface layer 21*c* as the third layer in this order. The above description is not limited to the pressure roller 21 including only these three layers. The pressure roller may include other layers between the respective layers. Another layer may be under the first layer or on or above the third layer. The core 21*a* as the first layer may be a solid layer as in the present embodiments or a hollow layer.

A radial direction of the pressure roller 21 is a direction orthogonal to the axial direction of the pressure roller 21 that is the lateral direction in FIG. 3. The radial direction of the pressure roller 21 is a direction along the paper surface of FIG. 2 and is each of directions from the center of a circle in a cross section of the pressure roller 21 toward the outer peripheral surface. In the following description, the radial direction of the pressure roller 21 is also simply referred to as the radial direction. In the following description, terms that are an inner portion of the pressure roller 21 in the radial direction and an outer portion of the pressure roller 21 in the radial direction are used. The inner portion of the pressure roller 21 in the radial direction is a portion inside the circle in the crosse section of the pressure roller 21. The outer portion of the pressure roller 21 in the radial direction is a portion outside the outer peripheral surface of the pressure roller 21.

As illustrated in FIG. 3, a conductor 38 is disposed on the outer peripheral surface of the exposed portion 21*a*1 in the vicinity of the body of the pressure roller 21. The conductor 38 is made of a conductive material. The conductor 38 is not in contact with the body of the pressure roller 21. The conductor 38 has a contacted portion contacted by a discharging brush 37 described below. The contacted portion is an outer peripheral surface of the conductor 38. In the radial direction of the pressure roller 21 orthogonal to the axial direction of the pressure roller 21, the contacted portion is at a substantially same position as the outer peripheral surface of the pressure roller 21 including the surface layer 21*c*.

The conductor 38 is attached to the outer peripheral surface of the exposed portion 21*a*1 and is electrically coupled to the core 21*a*. Therefore, the discharging brush 37 described below in contact with the conductor 38 removes electric charge from the core 21*a*. The conductor 38 in the present embodiment is a ring-shaped member but is not limited to this. The conductor 38 may be integrally formed as a part of the exposed portion 21*a*1 of the core 21*a*.

The conductor 38 is preferably made of an elastic material. The contraction force of the elastic material fixes the conductor 38 on the exposed portion 21*a*1 of the pressure roller 21. In other words, the contraction force positions the conductor 38 on the pressure roller 21. As a result, the discharging brush 37 can stably contact the conductor 38. The above-described configuration does not need a fixing member such as a screw to fix the conductor 38 on the pressure roller 21 and improves assembly workability when the conductor 38 is fixed on the pressure roller 21.

Bearings 39 support the exposed portions 21*a*1 of the core 21*a*. The exposed portion 21*a*1 is a part of a shaft of the pressure roller 21. The bearing 39 is made of a non-conductive material.

The fixing device according to the present embodiment also includes the discharging brush 37 as the discharger. The discharging brush 37 includes a contact portion 37*a* and a holder 37*b*. The contact portion 37*a* includes a plurality of hairs in contact with the core 21*a* or the surface layer 21*c*. The holder 37*b* holds a root of the hair that is one end of the hair of the contact portion 37*a*. The root is the one end of the hair opposite to the other end of the hair in contact with the core 21*a* or the surface layer 21*c*. The discharging brush 37 is grounded via a resistor. The discharger including a brush-like member as in the present embodiment such as the discharging brush 37 does not damage the core 21*a* and the surface layer 21*c* and removes the electric charge from each of the conductor 38 and the surface layer 21*c*.

In the axial direction of the pressure roller 21 that is a lateral direction in FIG. 3, the discharging brush 37 is positioned to face both the surface layer 21*c* and the exposed portion 21*a*1 of the pressure roller 21. The contact portion 37*a* of the discharging brush 37 comes into contact with both the surface layer 21*c* and the conductor 38. The above-described arrangement enables the discharging brush 37 to remove the electric charge from each of the core 21*a* and the surface layer 21*c*. The pressure roller 21 and the conductor 38 are discharged members that are brought into contact with the discharging brush 37.

As described above, the configuration of the present embodiment enables the common discharging brush 37 to remove the electric charge from both of the core 21*a* and the surface layer 21*c*. Therefore, the above-described configuration can solve the above-described disadvantage caused by the electric charge in the core 21*a* and the surface layer 21*c*. In addition, the above-described configuration can reduce the number of components of the fixing device, resulting in a reduction in the cost and the reduction in the size of the fixing device.

Figure 4:
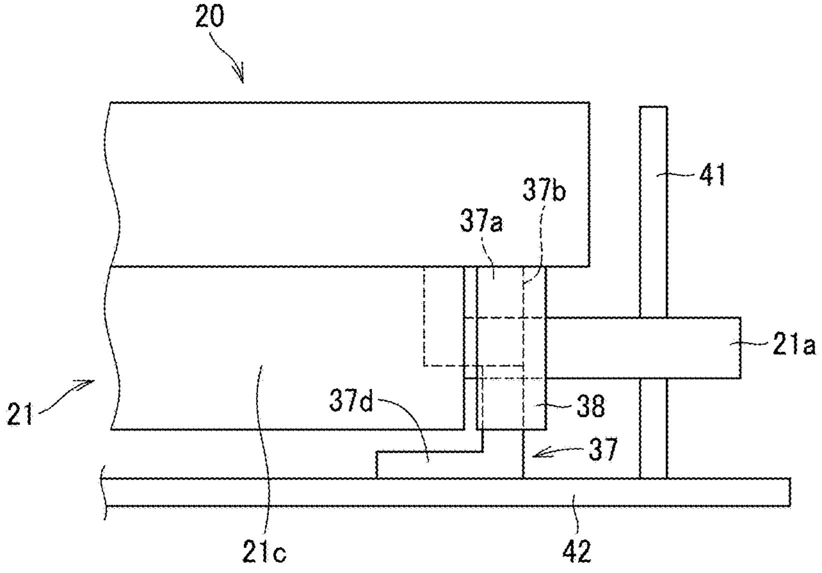
FIG. 4 is a plan view of a structure to assemble the discharging brush.
Figure 5:
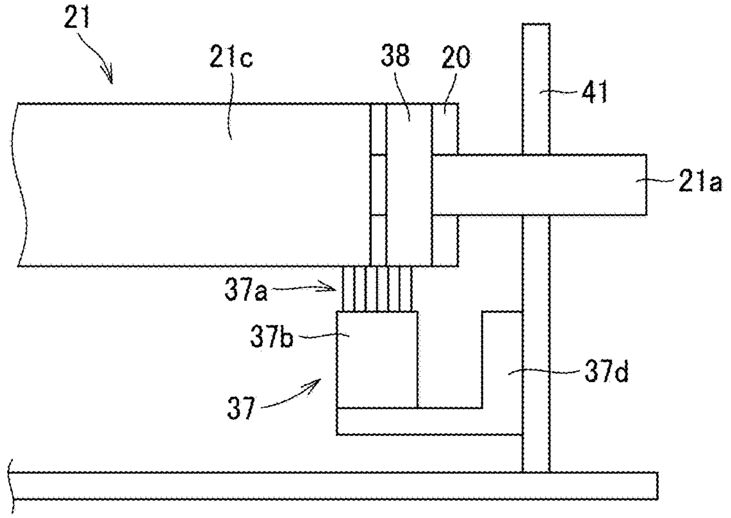
FIG. 5 is a plan view of another structure to assemble the discharging brush.

As illustrated in FIG. 4, the discharging brush 37 includes a held portion 37*d* opposite the contact portion 37*a*. The held portion 37*d* is assembled to a housing 42 of the fixing device. The housing 42 is made of a sheet metal. Alternatively, the held portion 37*d* may be assembled to a side plate 41 as illustrated in FIG. 5. The held portion 37*d* may be assembled by, for example, screwing. The side plate 41 has a hole to assemble the bearing into which the shaft of the pressure roller 21 is inserted. Accordingly, assembling the held portion 37*d* to the housing 42 as illustrated in FIG. 4 is more preferable than making additional hole in the side plate 41 to assemble the held portion 37*d* from the viewpoint of ensuring the strength of the side plate 41. FIG. 4 is a plan view of the above-described structure to assemble the discharging brush, and FIG. 5 is a front view of the above-described another structure to assemble the discharging brush.

As illustrated in FIG. 3, the outer peripheral surface of the exposed portion 21*a*1 is located in the inner portion of the pressure roller 21 in the radial direction and is farther from the discharging brush 37 than the surface layer 21*c* by the sum of the thickness of the elastic layer of the pressure roller 21 and the thickness of the surface layer 21*c* of the pressure roller 21 in the radial direction of the pressure roller 21. In the pressure roller 21 not including the conductor 38 and including the contact portion 37*a* in direct contact with the exposed portion 21*a*1, a contact position at which the contact portion 37*a* is in contact with the exposed portion 21*a*1 is away from the surface layer 21*c*. Therefore, the discharging brush needs a long hair in contact with the exposed portion 21*a*1. The long hair in contact with the exposed portion 21*a*1 may bend. The rigidity of the brush is lowered due to deterioration over time. The long hair in contact with the exposed portion 21*a*1 causes the contact state of the contact portion 37*a* to be unstable due to the deterioration. The pressure roller not including the conductor has the above-described disadvantages.

In contrast, a contact position at which the conductor 38 in the present embodiment is in contact with the contact portion 37*a* is closer to the contact position at which the surface layer 21*c* is in contact with the contact portion 37*a* in the radial direction of the pressure roller 21. Specifically, the outer peripheral surface of the conductor 38 that is the contacted portion of the conductor 38 is outside the outer peripheral surface of the exposed portion 21*a*1 in the radial direction of the pressure roller 21. The above-described configuration including the conductor 38 sets the contact position at which the contact portion 37*a* is in contact with the conductor 38 to be close to the contact position at which the contact portion 37*a* is in contact with the surface layer 21*c*. As a result, the contact portion 37*a* including the hairs arranged in the axial direction of the pressure roller 21 can be in contact with the conductor 38 and the surface layer 21*c* under a condition in which the contact positions are close each other. The above-described configuration in the present embodiment does not need the long hair in contact with the exposed portion 21*a*1. Therefore, the contact portion 37*a* stably comes into contact with the conductor 38 and the surface layer 21*c* and stably remove the electric charge from the core 21*a* and the surface layer 21*c*. In particular, since the conductor 38 in the present embodiment has an outer diameter that is substantially equal to an outer diameter of the pressure roller 21 including the surface layer 21*c*, the contact portion 37*a* can be in contact with the conductor 38 and the surface layer 21*c* under a condition in which the contact positions are very close each other. Accordingly, the contact portion 37*a* can more stably come into contact with the conductor 38 and the surface layer 21*c*.

Figure 6:
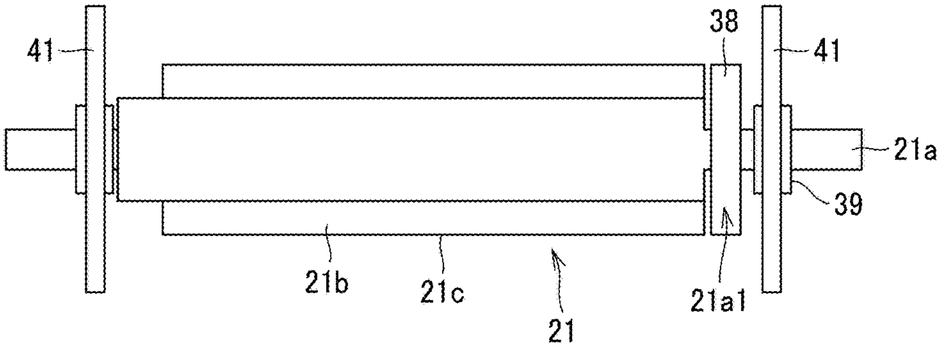
FIG. 6 is a plan view of a holding structure including side plates to hold the pressure roller.

In addition, the conductor 38 disposed on the exposed portion 21*a*1 in the present embodiment can restrict movement of the pressure roller 21 in the axial direction of pressure roller 21. As illustrated in FIG. 6, the side plates 41 hold the shaft of the pressure roller 21 via the bearings 39. When the pressure roller 21 is displaced in the axial direction, the conductor 38 having the diameter larger than the shaft comes into contact with the bearing 39, thereby restricting the movement of the pressure roller 21 in the axial direction. As a result, the side plates 41 can hold the pressure roller 21 at a predetermined position in the axial direction. The pressure roller 21 not including the conductor 38 includes restricting members such as C-rings that are set on both ends of the shaft projecting outside the bearings 38 supported by the side plates 41 and come into contact with the bearings 38 to restrict the axial movement of the pressure roller 21. The configuration of the present embodiment can omit such a restricting member and simplify the configuration of the side plate 41 holding the pressure roller 21. An enlarged-diameter portion 21*a*2 in FIG. 7 described below can similarly restrict the movement of the pressure roller 21 in the axial direction of the pressure roller 21.

Next, other embodiments are described below. In each of the other embodiments, the conductor 38 has a configuration different from the above-described configuration.

Figure 7A:
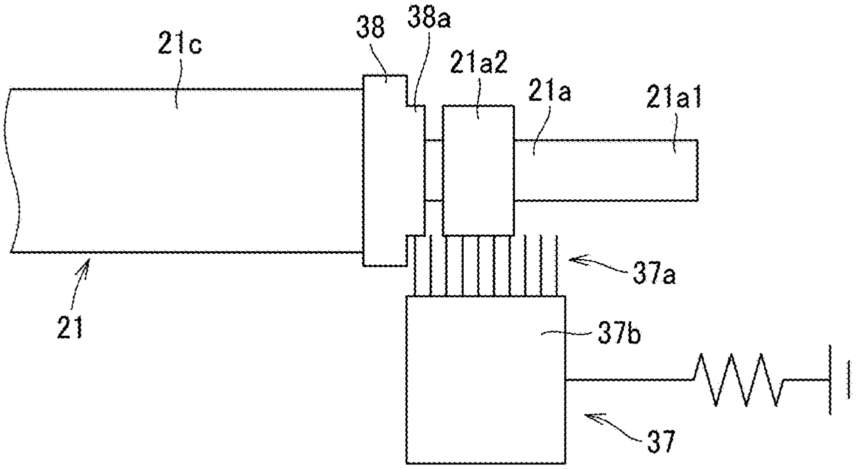
FIG. 7A is a plan view of a conductor according to an embodiment of the present disclosure.
Figure 7B:
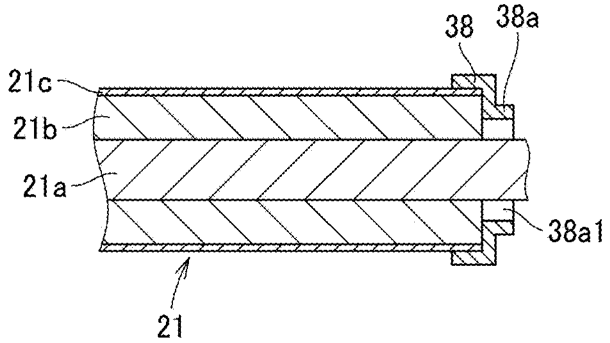
FIG. 7B is a cross-sectional view of the conductor of FIG. 7A.

As illustrated in FIG. 7A, the conductor 38 in the present embodiment is attached to the pressure roller 21 so as to cover one side of the body of the pressure roller 21 in the axial direction. FIG. 7B is a cross-sectional view of the conductor 38 attached to the pressure roller 21. As illustrated in FIG. 7B, the conductor 38 is in contact with the surface layer 21*c*. The conductor 38 includes a cylindrical portion 38*a* having a smaller diameter than a portion covering the body of the pressure roller 21. The cylindrical portion 38*a* projects toward an end of the shaft in the axial direction. The outer peripheral surface of the cylindrical portion 38*a* is the contacted portion contacted by the discharging brush 37. The outer diameter of the cylindrical portion 38*a* is smaller than the outer diameter of the pressure roller 21 including the surface layer 21*c*. The cylindrical portion 38*a* has an insertion hole 38*a*1 inside the cylindrical portion 38*a*. The exposed portion 21*a*1 penetrates through the insertion hole 38*a*1 and protrudes from the one side the cylindrical portion 38*a* in the axial direction toward outside of the pressure roller 21.

The core 21*a* includes the enlarged-diameter portion 21*a*2 as a first exposed portion on a part of the exposed portion 21*a*1 in the axial direction. In the radial direction, the enlarged-diameter portion 21*a*2 is longer than another portion of the exposed portion 21*a*1 that is a second exposed portion other than the enlarged-diameter portion 21*a*2. In the present embodiment, the outer peripheral surface of the enlarged-diameter portion 21*a*2 and the outer peripheral surface of the cylindrical portion 38*a* are disposed at substantially the same position in the radial direction.

As illustrated in FIG. 7A, the contact portion 37*a* of the discharging brush 37 according to the present embodiment is in contact with the outer peripheral surface of the cylindrical portion 38*a* of the conductor 38 and the enlarged-diameter portion 21*a*2 of the exposed portion 21*a*1. The above-described arrangement enables the discharging brush 37 to remove the electric charge from the core 21*a* and the surface layer 21*c*.

In addition, setting the outer diameter of the cylindrical portion 38*a* to be smaller than the outer diameter of the pressure roller 21 including the surface layer 21*c* enables the contact positions in the radial direction at which the discharging brush 37 is in contact with members to be close to each other. The above-described configuration enables the contact portion 37*a* to stably remove the electric charge from the core 21*a* and the surface layer 21*c*. In addition, setting the contact portion 37*a* to be in contact with the enlarged-diameter portion 21*a*2 of the exposed portion 21*a*1 enables the contact positions in the radial direction at which the discharging brush 37 is in contact with members to be close to each other. The above-described configuration enables the contact portion 37*a* to stably remove the electric charge from the core 21*a* and the surface layer 21*c*. In particular, setting the outer peripheral surface of the enlarged-diameter portion 21*a*2 and the outer peripheral surface of the cylindrical portion 38*a* to be at substantially the same position in the radial direction in the present embodiment enables setting contact conditions in the radial direction in which the discharging brush 37 is in contact with members to be substantially equivalent. The above-described configuration enables the contact portion 37*a* to stably remove the electric charge from the core 21*a* and the surface layer 21*c*. Attaching a member to each of the surface layer 21*c* and the core 21*a* enables the member to be close to the position of the contact portion 37*a* of the discharging brush 37 in the radial direction.

Figure 8:
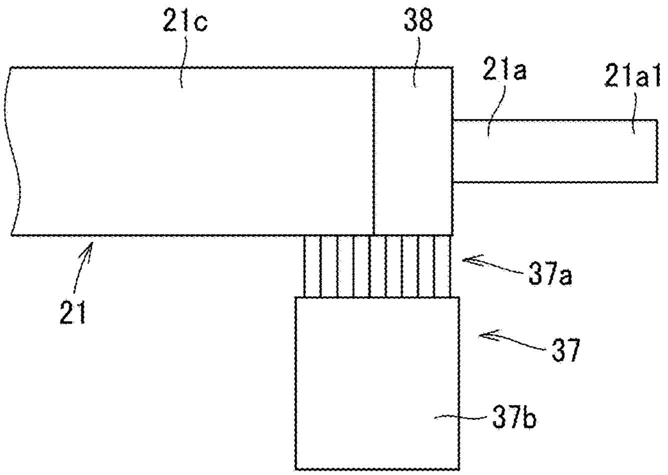
FIG. 8 is a plan view of a conductor according to an embodiment of the present disclosure.

An embodiment illustrated in FIG. 8 is described below. The conductor 38 in the present embodiment is in contact with one side of the body of the pressure roller 21 in the axial direction. The outer diameter of the conductor 38 is substantially equal to the outer diameter of the pressure roller 21 including the surface layer 21*c*, and the conductor 38 is in contact with an end of the surface of the surface layer 21*c* of the pressure roller 21. That is, the conductor 38 in the present embodiment is disposed on the outer peripheral surface of the exposed portion 21*a*1 and is in contact with the core 21*a* in addition to the surface layer 21*c*. Thus, the conductor 38 is electrically coupled to the core 21*a* and the surface layer 21*c*.

The discharging brush 37 is in contact with the conductor 38 and the surface layer 21*c*. However, the discharging brush 37 may be in contact with one of the conductor 38 and the surface layer 21*c*. The above-described configuration enables the contact portion 37*a* to stably remove the electric charge from the core 21*a* and the surface layer 21*c*.

Figure 9A:
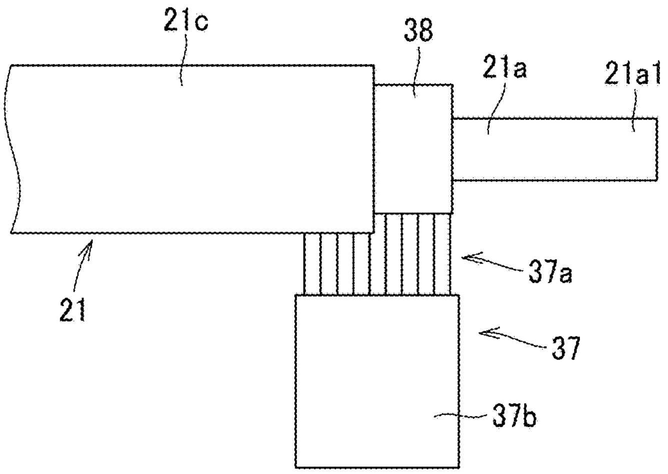
FIG. 9A is a plan view of a conductor according to an embodiment of the present disclosure.
Figure 9B:
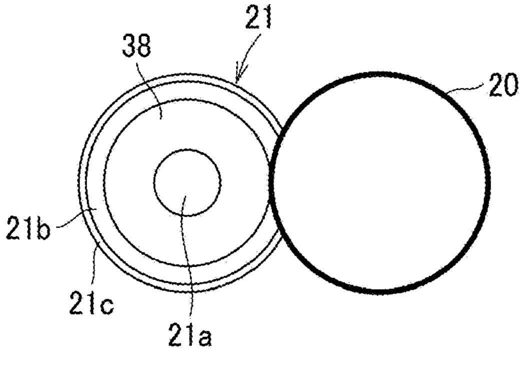
FIG. 9B is a side view of the conductor of FIG. 9A.

An embodiment illustrated in FIGS. 9A and 9B is described below. The outer diameter of the conductor 38 in the present embodiment is smaller than the outer diameter of the pressure roller 21 including the surface layer 21*c* that is the outer diameter of the body of the pressure roller 21. Also in the present embodiment, the discharging brush 37 can stably come into contact with the surface layer 21*c* of the pressure roller 21 and the conductor 38 and stably remove the electric charge from the surface layer 21*c* and the core 21*a*.

As illustrated in FIG. 9B, the outer peripheral surface of the conductor 38 is in contact with the outer peripheral surface of the fixing belt 20 after the fixing device is assembled. In addition, the conductor 38 is in contact with one side of the body of the pressure roller 21 in the axial direction. As a result, the heat of the pressure roller 21 and the fixing belt 20 moves to the conductor 38, resulting in heat loss in the fixing device. The conductor 38 having the smaller diameter as described above reduces a contact area between the conductor 38 and the fixing belt 20 and a contact area between the conductor 38 and the pressure roller 21, reducing an amount of heat transmitted to the conductor 38. The outer diameter of the conductor 38 may be further reduced so that the conductor 38 is not in contact with the fixing belt 20.

Figure 10:
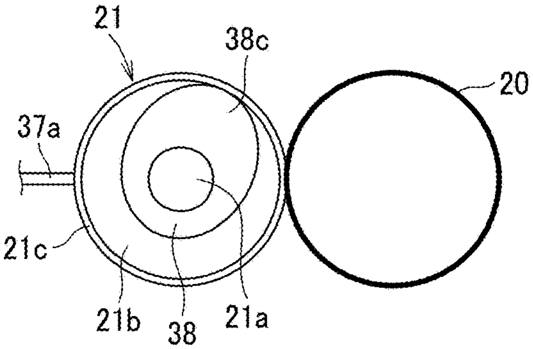
FIG. 10 is a side view of a conductor according to an embodiment of the present disclosure.

An embodiment illustrated in FIG. 10 is described below. The conductor 38 in the present embodiment has different diameters in a circumferential direction of the conductor 38. In the present embodiment, the conductor 38 comes into contact with the fixing belt 20 only when the rotation of the pressure roller 21 moves a large-diameter portion 38*c* of the conductor 38 to a position facing the fixing belt 20. Accordingly, the above-described configuration can reduce an amount of heat transferred from the fixing belt 20 to the conductor 38. In addition, the conductor 38 comes into contact with the discharging brush 37 only when the rotation of the pressure roller 21 moves the large-diameter portion 38*c* of the conductor 38 to a position facing the contact portion 37*a*. Therefore, the discharging function of the discharging brush 37, that is the function to remove the electric charge from the pressure roller 21, is not impaired. The above described configuration in which the conductor 38 having the different diameters in the circumferential direction comes into contact with the fixing belt 20 only in a partial region in the circumferential direction can reduce the amount of heat transferred from the fixing belt 20 to the conductor 38, and the discharging brush 37 can function as the discharger.

Figure 11A:
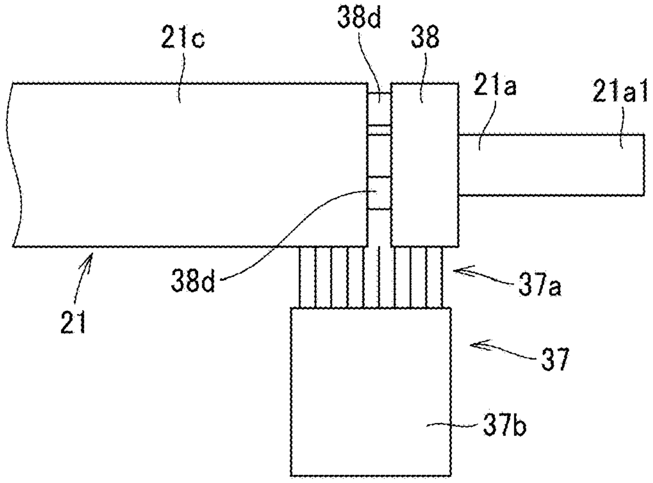
FIG. 11A is a plan view of a conductor according to an embodiment of the present disclosure.
Figure 11B:
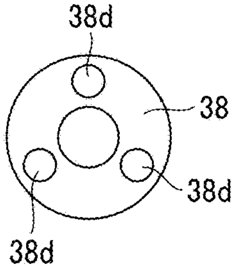
FIG. 11B is a side view of the conductor of FIG. 11A.

An embodiment illustrated in FIGS. 11A and 11B is described below. The conductor 38 in the present embodiment includes a plurality of projections 38*d* projecting toward the pressure roller 21 in the axial direction. The plurality of projections 38*d* are arranged in the circumferential direction of the conductor 38. In the present embodiment, the conductor 38 is in contact with the body of the pressure roller 21 at the ends of the projections 38*d*. Thus, the conductor 38 is positioned with respect to the body of the pressure roller 21. As a result, the discharging brush 37 can stably contact the conductor 38. A contact area between the conductor 38 according to the present embodiment and the pressure roller 21 is smaller than a contact area between the conductor 38 according to the embodiment illustrated in FIG. 9 and the pressure roller 21. Accordingly, the above-described configuration can reduce the amount of heat transferred from the pressure roller 21 to the conductor 38.

The number of the projections 38*d* is not limited to three as in the embodiment illustrated in FIGS. 11A and 11B and may be appropriately changed. In addition, the shape of the projection 38*d* and the arrangement of the projections 38*d* may be appropriately changed. For example, the projections 38*d* may be arranged in the circumferential direction to form a circle. Preferably the contact area where the conductor 38 comes into contact with the body of the pressure roller 21 in the axial direction is equal to or less than one third of the area of the pressure roller 21. Setting the contact area as described above can effectively reduce the amount of heat transferred from the pressure roller 21 to the conductor 38. One third of the area of the pressure roller 21 means one third of the entire area of a cross section orthogonal to the axial direction of the pressure roller 21 at a position where the conductor 38 is in contact with the pressure roller 21 in the axial direction.

Figure 12:
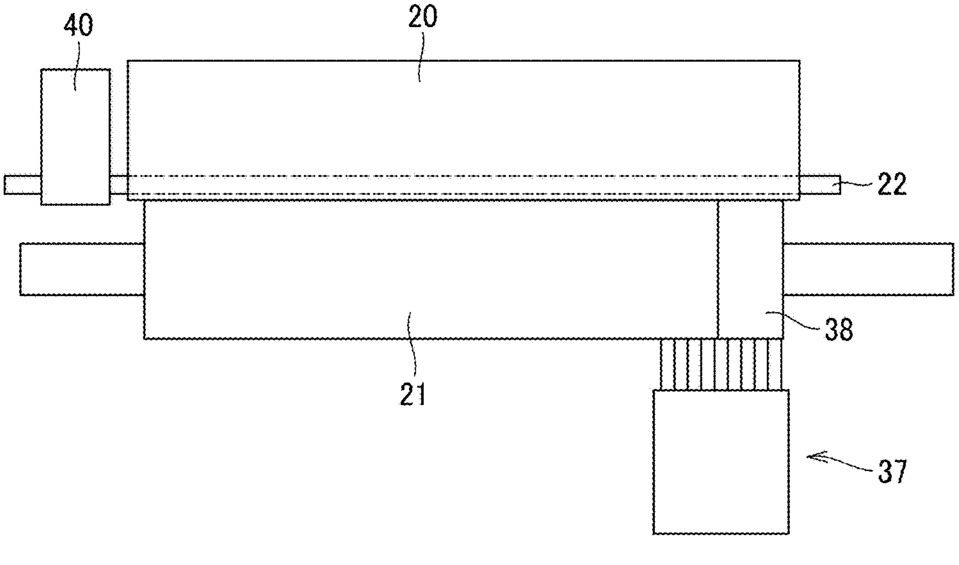
FIG. 12 is a plan view of the conductor, a pressure roller, and a connector, illustrating a location of the conductor in a longitudinal direction of the pressure roller.

As illustrated in FIG. 12, the position of the conductor 38 in the axial direction of the pressure roller 21 is preferably opposite to the position of a connector 40 serving as a power supply member supplying power to the heater 22 with respect to the center of the fixing device in the longitudinal direction of the fixing device or the fixing belt 20 that is the lateral direction in FIG. 12. Since the heater 22 needs an area in contact with the connector 40, one end of the heater 22 in contact with the connector 40 in the axial direction of the pressure roller 21 is longer than the other end of the heater 22. As a result, temperature of one end of the fixing belt 20 adjacent to the one end of the heater 22 is likely to be lower than temperature of the other end of the fixing belt 20. Heat transfers from the pressure roller 21 and the fixing belt 20 to the conductor 38. Accordingly, placing the conductor 38 to face the other end of the heater 22 opposite to the one end of the heater 22 in contact with the connector 40 in the axial direction enables balancing temperature of the one end of the fixing belt 20 and temperature of the other end of the fixing belt 20 and balancing temperature of one end of the pressure roller 21 and temperature of the other end of the pressure roller 21 in the axial direction. As a result, the above-described configuration can prevent a temperature drop in only one of the one end and the other end of the fixing belt 20 and the pressure roller 21 in the axial direction.

In the above-described embodiments, the discharging brush removes the electric charge from the first layer and the third layer of the pressure roller as the first rotator. Instead of the third layer of the first rotator, the discharging brush may remove the electric charge from a surface layer of the second rotator. Since the surface layer 21*c* of the pressure roller 21 is in contact with a surface layer 20*c* of the fixing belt 20 at the fixing nip N, removing the electric charge from either one the pressure roller 21 or the fixing belt 20 can remove the charges accumulated in the surface layer 21*c* of the pressure roller 21 and the surface layer 20*c* of the fixing belt 20.

Figure 13:
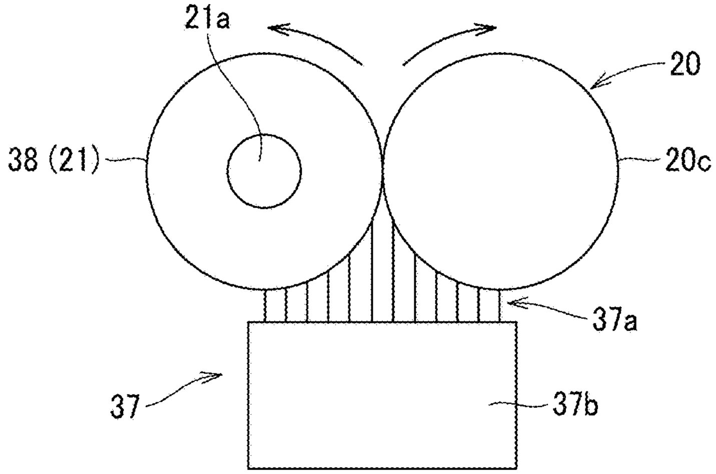
FIG. 13 is a side view of a configuration including the discharging brush in contact with a fixing belt.

For example, as illustrated in FIG. 13, the contact portion 37*a* of the discharging brush 37 is in contact with the conductor 38 on the core 21*a* of the pressure roller 21 and the surface layer 20*c* of the fixing belt 20 as the second rotator.

As in the embodiment illustrated in FIG. 3, the conductor 38 is disposed on the outer peripheral surface of the exposed portion 21*a*1 in the embodiment illustrated in FIG. 13. The outer diameter of the conductor 38 is substantially the same as the outer diameter of the pressure roller 21 including the surface layer 21*c*. A length of the hair of the discharging brush 37 to remove the electric charge from the core 21*a* in the above-described configuration is shorter than a length of the hair of the discharging brush in direct contact with the core 21*a*. In other words, the position in the radial direction at which the discharging brush 37 is in contact with the outer peripheral surface of the conductor 38 is close to the position in the radial direction at which the discharging brush 37 is in contact with the surface layer 20*c* of the fixing belt 20.

The contact portion 37*a* of the discharging brush 37 comes into contact with both the surface layer 21*c* of the fixing belt 20 and the conductor 38. As a result, the common discharging brush 37 removes the electric charge from both the core 21*a* of the pressure roller 21 and the surface layer 20*c* of the fixing belt 20. The contact position in the radial direction at which the contact portion 37*a* is in contact with the surface layer 20*c* of the fixing belt 20 is close to the contact position in the radial direction at which the contact portion 37*a* is in contact with the conductor 38. In the above-described configuration, the discharging brush can stably remove the electric charge from the surface layer 20*c* of the fixing belt 20 and the core 21*a* of the pressure roller 21. The fixing belt 20 and the conductor 38 are discharged members from which the electric charge is removed by contacting the discharging brush 37.

Figure 14:
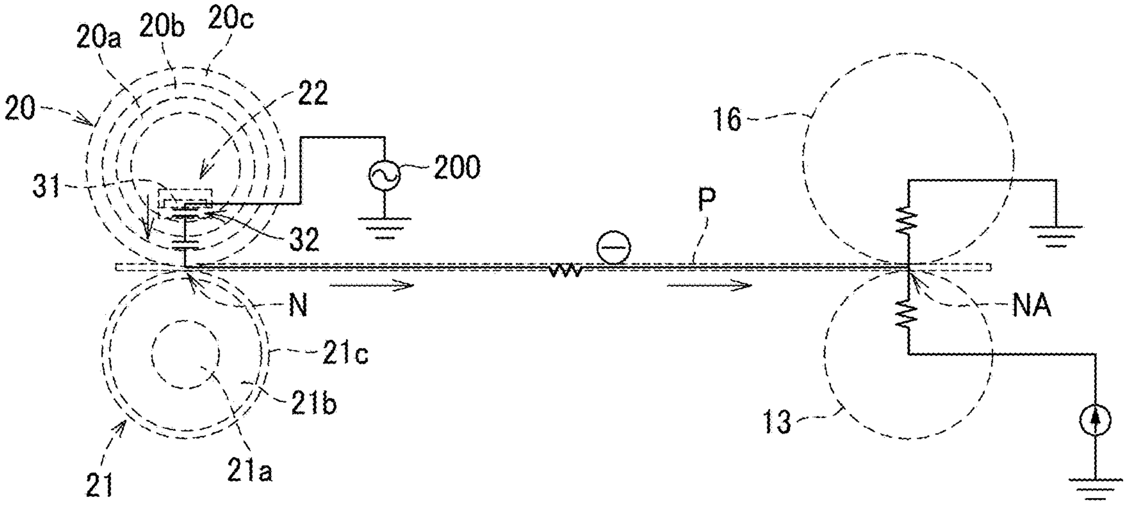
FIG. 14 is a schematic diagram for describing how a banding image is formed.

The discharging brush 37 in the embodiments remove the electric charge from the surface of the fixing belt 20 to prevent occurrence of a banding image. In the fixing device 9 including the heater 22 to which an alternating current (AC) voltage is applied, the insulation layer in the heater 22 and the surface layer of the fixing belt 20 are equivalent to the capacitors. The fixing belt 20 in contact with the heater 22 applies the AC voltage to the fixing nip N. As illustrated in FIG. 14, the sheet P in contact with both the fixing nip N and the secondary transfer nip NA transmits the AC voltage to the secondary transfer nip NA in a direction indicated by arrow in FIG. 14. The AC voltage affects the transfer electric field to cause periodic density unevenness in the transferred image that is called the banding image. In particular, in a case where the sheet P has low resistance, for example, in a high-humidity environment or when a thin paper sheet is used as the sheet P, the above-described disadvantage is likely to occur. The secondary transfer nip NA is a nip portion formed between the secondary transfer roller 13 and a secondary-transfer backup roller 16.

The discharging brush 37 in the present embodiment passes an alternating current from the fixing nip N to the ground via the fixing belt 20. Alternatively, the discharging brush 37 passes an alternating current from the fixing nip N to the ground via the fixing belt 20 and the conductor 38. As a result, the occurrence of the above-described banding image is prevented.

In the configuration in which the conductor 38 is in contact with the core 21*a* of the pressure roller 21 and the surface layer 21*c* of the pressure roller 21 as illustrated in FIG. 8, the discharging brush 37 may be brought into contact with the surface layer 20*c* of the fixing belt 20 instead of bringing the discharging brush 37 into contact with the pressure roller 21.

Next, a configuration of the heater disposed in the above-described fixing device is described.

Figure 15:
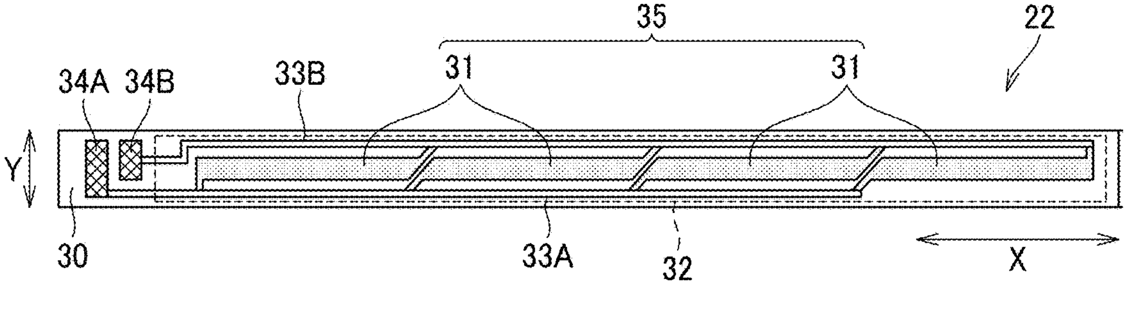
FIG. 15 is a plan view of a heater.

FIG. 15 is a plan view of the heater according to the present embodiment.

As illustrated in FIG. 15, the heater 22 includes the planar base 30. On the surface of the base 30, a plurality of resistive heat generators 31 (four resistive heat generators 31), power supply lines 33A and 33B that are conductors, a first electrode 34A, and a second electrode 34B are disposed. However, the number of resistive heat generators 31 is not limited to four in the present embodiment.

In the present embodiment, the longitudinal direction of the heater 22 and the like (that is the direction perpendicular to the surface of the paper on which FIG. 2 is drawn) is also an arrangement direction X in which the plurality of resistive heat generators 31 are arranged as illustrated in FIG. 15. The arrangement direction X is the same direction as the longitudinal direction of the fixing belt 20 and the axial direction of the pressure roller 21. Hereinafter, the direction X is also simply referred to as the arrangement direction. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Yin FIG. 15. multiple The direction Y intersecting the arrangement direction is a direction along the surface of the base 30 on which the resistive heat generators 31 are arranged and is also a short-side direction of the heater 22 and a conveyance direction of the sheet P passing through the fixing device 9.

The plurality of resistive heat generators 31 configure a plurality of heat generation portions 35 divided in the arrangement direction. The resistive heat generators 31 are electrically coupled in parallel to a pair of electrodes 34A and 34B disposed on one end of the base 30 in the arrangement direction (that is a left end of the base 30 in FIG. 15) via the power supply lines 33A and 33B. The power supply lines 33A and 33B are made of conductors having an electrical resistance value smaller than an electrical resistance value of the resistive heat generator 31. A gap area between neighboring resistive heat generators 31 is preferably 0.2 mm or more, more preferably 0.4 mm or more from the viewpoint of maintaining the insulation between the neighboring resistive heat generators 31. If the gap area between the neighboring resistive heat generators 31 is too large, the gap area is likely to cause temperature decrease in the gap area. Accordingly, from the viewpoint of reducing the temperature unevenness in the arrangement direction, the gap area is preferably equal to or shorter than 5 mm, and more preferably equal to or shorter than 1 mm.

The resistive heat generator 31 is made of a material having a positive temperature coefficient (PTC) of resistance that is a characteristic that the resistance value increases (the heater output decreases) as the temperature T increases.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. Since a constant voltage is applied to the resistive heat generators 31, the increase in resistance values of the resistive heat generators 31 caused by the temperature increase in the regions outside the width of the small sheets relatively reduces outputs (heat generation amounts) of the resistive heat generators 31 in the regions, thus restraining an increase in temperature in the regions that are end portions of the fixing belt outside the small sheets. Electrically coupling the plurality of resistive heat generators 31 in parallel can restrain temperature rises in non-sheet passing portions while maintaining the print speed. The heat generator that configures the heat generation portion 35 may not be the resistive heat generator having the PTC characteristic. The resistive heat generators in the heater 22 may be arranged in a plurality of rows arranged in the direction intersecting the arrangement direction.

The resistive heat generators 31 are produced, for example, as below. Silver-palladium (AgPd), glass powder, and the like are mixed to make paste. The paste is coated to the base 30 by screen printing or the like. Thereafter, the base 30 is subject to firing. Then, the resistive heat generators 31 are produced. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag), silver palladium (AgPd) or the like may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30. The base 30 made of stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers, insulates, and protects the resistive heat generators 31 and the power supply lines 33A and 33B, and additionally retains slidability with the fixing belt 20.

Figure 16:
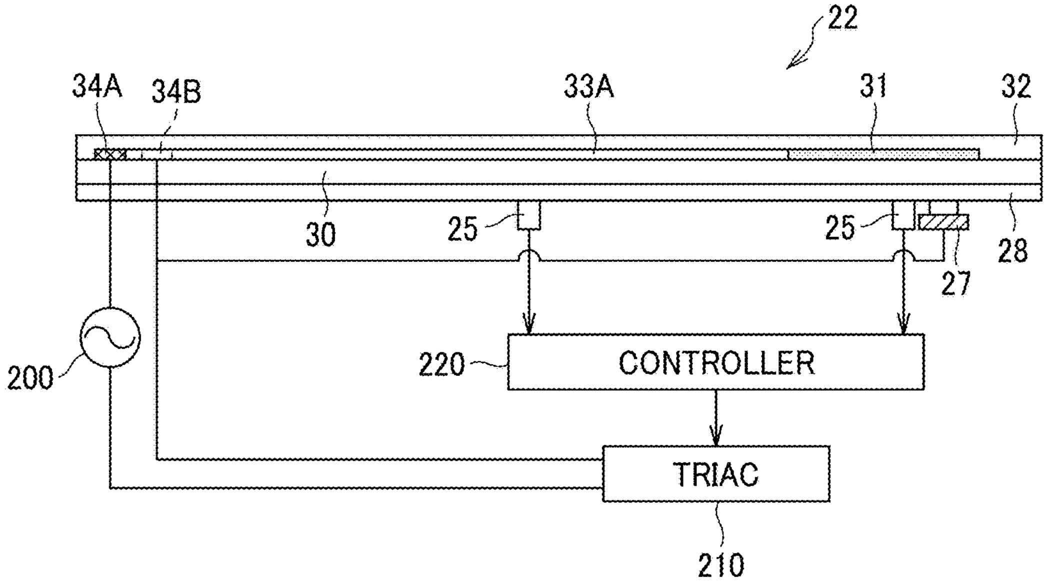
FIG. 16 is a schematic diagram illustrating a circuit to supply power to the heater.

FIG. 16 is a schematic diagram illustrating a circuit to supply power to the heater according to the present embodiment.

As illustrated in FIG. 16, the alternating current power supply 200 is electrically coupled to the electrodes 34A and 34B of the heater 22 to configure a power supply circuit in the present embodiment to supply power to the resistive heat generators 31. The power supply circuit includes a triac 210 that controls the amount of power supplied. A controller 220 controls an amount of power supplied to the resistive heat generators 31 via the triac 210 based on temperatures detected by the thermistors 25. The controller 220 includes a microcomputer including, for example, a central processing unit (CPU), a read only memory (ROM), a random access memory (RAM), and an input and output (I/O) interface.

In the present embodiment, one thermistor 25 is disposed in the central region in the arrangement direction of the heaters 22 that is the region inside a sheet conveyance span for the smallest sheet, and the other thermistor 25 is disposed in one end portion of the heater 22 in the arrangement direction. A thermostat 27 as a power cut-off device is disposed in the one end portion of the heater 22 in the arrangement direction and cuts off power supply to the resistive heat generators 31 when the temperature of the resistive heat generator 31 becomes a predetermined temperature or higher. The thermistors 25 and the thermostat 27 contact the first high thermal conduction member 28 to detect the temperature of the first high thermal conduction member 28.

Figure 17:
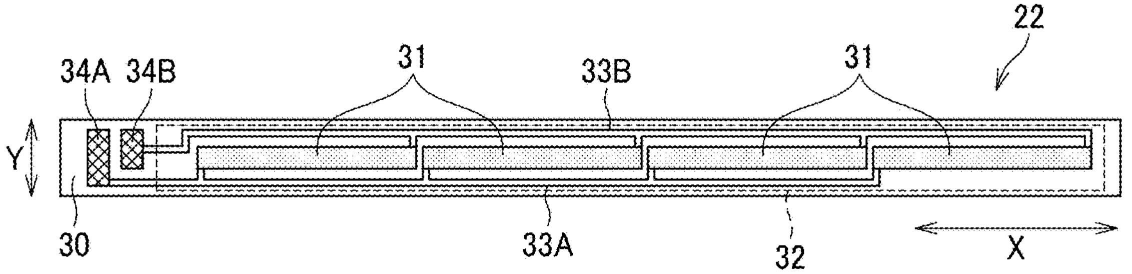
FIG. 17 is a plan view of a heater including resistive heat generators each having a form different from the form of the resistive heat generator illustrated in FIG. 15.
Figure 18:
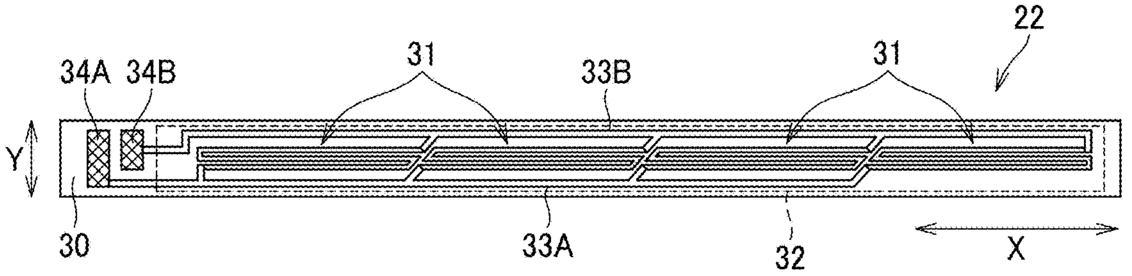
FIG. 18 is a plan view of a heater including resistive heat generators each having a form different from each of the forms of the resistive heat generators illustrated in FIGS. 15 and 17.

The first electrode 34A and the second electrode 34B are disposed on the same end portion of the base 30 in the arrangement direction in the present embodiment but may be disposed on both end portions of the base 30 in the arrangement direction. The shape of resistive heat generator 31 is not limited to the shape in the present embodiment. For example, as illustrated in FIG. 17, the shape of resistive heat generator 31 may be a rectangular shape, or as illustrated in FIG. 18, the resistive heat generator 31 may be configured by a linear portion folding back to form a substantially parallelogram shape. In addition, as illustrated in FIG. 17, portions each extending from the resistive heat generator 31 having a rectangular shape to one of the power supply lines 33A and 33B (the portion extending in the direction intersecting the arrangement direction) may be a part of the resistive heat generator 31 or may be made of the same material as the power supply lines 33A and 33B.

Figure 19A:
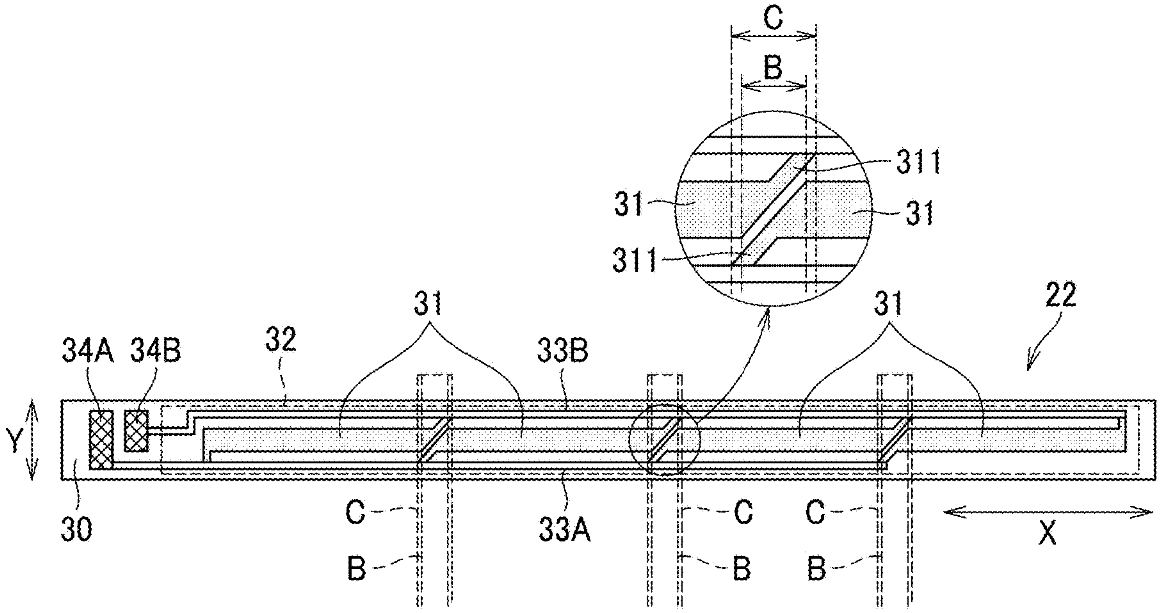
FIG. 19A is a plan view of the heater including the resistive heat generators of FIG.
Figure 19B:
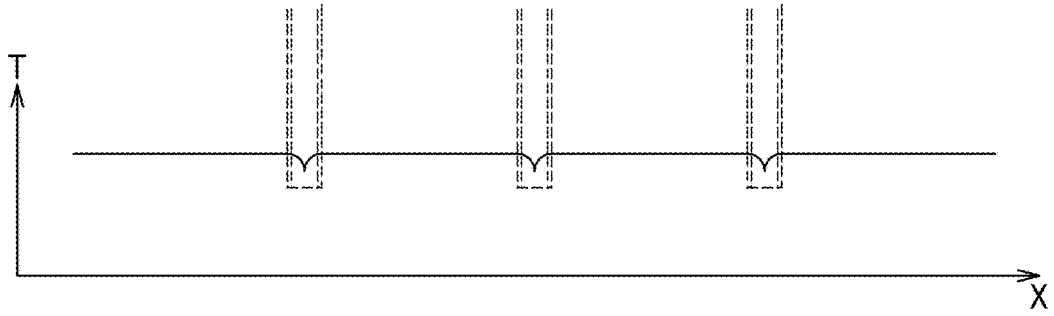
FIG. 19B is a graph illustrating a temperature distribution of the fixing belt in an arrangement direction of the resistive heat generators of the heater of FIG. 19A.

FIG. 19 is a diagram illustrating a temperature distribution of the fixing belt 20 in the arrangement direction. FIG. 19A is a diagram illustrating an arrangement of the resistive heat generators 31 of the heater 22. FIG. 19B is a graph, a vertical axis represents the temperature T of the fixing belt 20, and a horizontal axis represents the position of the fixing belt 20 in the arrangement direction.

As illustrated in FIGS. 19A and 19B, the plurality of resistive heat generators 31 of the heater 22 are separated from each other in the arrangement direction to form separation areas B including gap areas between the neighboring resistive heat generators 31. In other words, the heater 22 has gap areas between the plurality of resistive heat generators 31. As illustrated in an enlarged view of FIG. 19A, the separation area B includes the entire gap area sandwiched by the adjoining resistive heat generators 31. In addition, the separation area B includes parts of the resistive heat generators sandwiched between lines extending in a direction orthogonal to the arrangement direction from both ends of the gap area in the arrangement direction of the resistive heat generators 31. The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 on the separation area B becomes smaller than the temperature of the fixing belt 20 on another area, which causes temperature unevenness in the arrangement direction of the fixing belt 20 as illustrated in FIG. 19B. Similarly, the temperature of the heater 22 on the separation area B becomes smaller than the temperature of the heater 22 on another area of the heat generation portion 35. In addition to the separation area B, the heater 22 has an enlarged separation area C including areas corresponding to connection portions 311 of the resistive heat generators 31 and the separation area B as illustrated in the enlarged view of FIG. 19A. The connection portion 311 is defined as a portion of the resistive heat generator 31 that extends in the direction intersecting the arrangement direction and is connected to one of the power supply lines 33A and 33B. Similar to the separation area B, the temperature of the heater 22 on the enlarged separation area C and the temperature of the fixing belt 20 on the enlarged separation area C are smaller than the temperatures of the heater 22 and the fixing belt 20 on another area of the heat generation portion 35.

Figure 20:
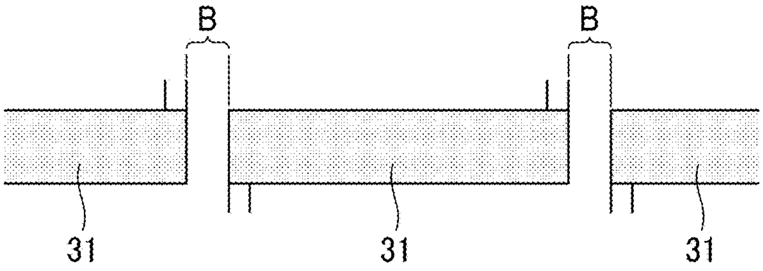
FIG. 20 is a diagram illustrating separation areas of the heater of FIG. 17.
Figure 21:
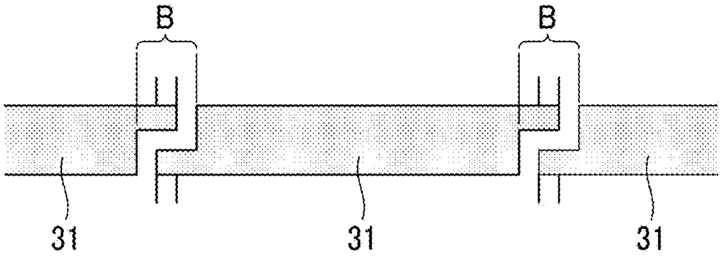
FIG. 21 is a diagram illustrating separation areas each having a form different from the form of the separation area of FIG. 20.
Figure 22:
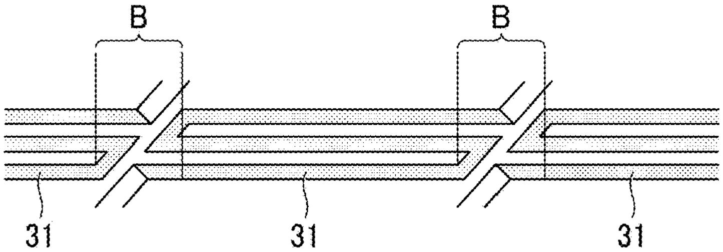
FIG. 22 is a diagram illustrating separation areas of the heater of FIG. 18.

As illustrated in FIG. 20, the heater 22 including the rectangular resistive heat generators 31 illustrated in FIG. 17 also has the separation areas B having lower temperatures than another area of the heat generation portion 35. In addition, the heater 22 including the resistive heat generators 31 having forms as illustrated in FIG. 21 has the separation areas B with lower temperatures than another area of the heat generation portion 35. As illustrated in FIG. 22, the heater 22 including the resistive heat generators 31 having forms as illustrated in FIG. 18 has the separation areas B with lower temperatures than another area of the heat generation portion 35. However, overlapping the resistive heat generators 31 lying next to each other in the arrangement direction as illustrated in FIGS. 19, 21, and 22 can reduce the above-described temperature drop that the temperature of the fixing belt 20 above the separation area B is smaller than the temperature of the fixing belt 20 above an area other than the separation area B.

The fixing device 9 in the present embodiment includes the first high thermal conduction member 28 described above in order to reduce the temperature drop on the separation area B as described above and reduce the temperature unevenness in the arrangement direction of the fixing belt 20. Next, a detailed description is given of the first high thermal conduction member 28.

As illustrated in FIG. 2, the first high thermal conduction member 28 is disposed between the heater 22 and the stay 24 in the lateral direction of FIG. 2 and is particularly sandwiched between the heater 22 and the heater holder 23. One side of the first high thermal conduction member 28 is brought into contact with the back surface of the base 30, and the other side of the first high thermal conduction member 28 is brought into contact with the heater holder 23.

The stay 24 has two rectangular portions 24*a* extending in a thickness direction of the heater 22 and each having a contact surface 24*a*1 that contacts the back side of the heater holder 23 to support the heater holder 23, the first high thermal conduction member 28, and the heater 22. In the direction intersecting the arrangement direction that is the vertical direction in FIG. 2, the contact surfaces 24*a*1 are outside the resistive heat generators 31. The above-described structure prevents heat transfer from the heater 22 to the stay 24 and enables the heater 22 to effectively heat the fixing belt 20.

Figure 23:
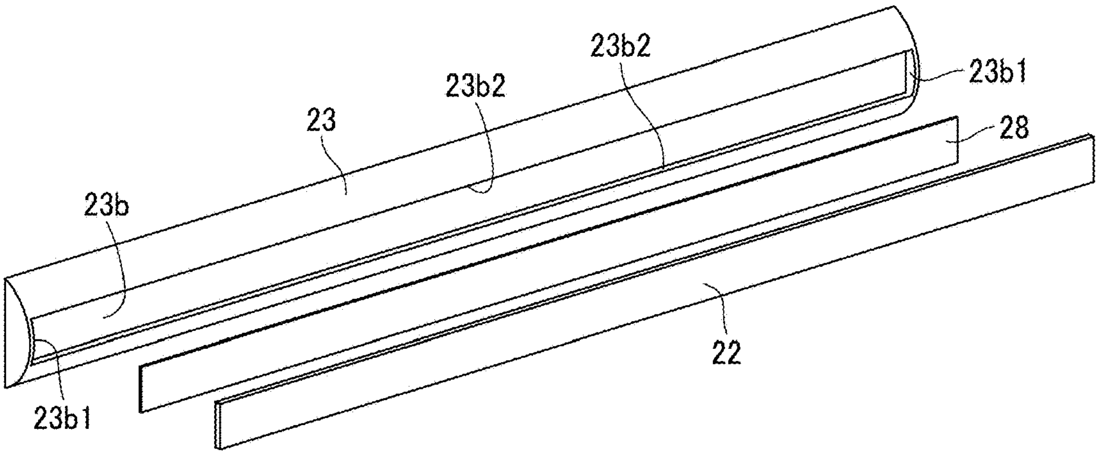
FIG. 23 is a perspective view of the heater, a first high thermal conduction member, and a heater holder.

As illustrated in FIG. 23, the first high thermal conduction member 28 is a plate having a thickness of 0.3 mm, a length of 222 mm in the arrangement direction, and a width of 10 mm in the direction intersecting the arrangement direction. In the present embodiment, the first high thermal conduction member 28 is made of a single plate but may be made of a plurality of members. In FIG. 23, the guide 26 in FIG. 2 is omitted.

The first high thermal conduction member 28 is fitted into a recessed portion 23*b* of the heater holder 23, and the heater 22 is mounted thereon. Thus, the first high thermal conduction member 28 is sandwiched and held between the heater holder 23 and the heater 22. In the present embodiment, the length of the first high thermal conduction member 28 in the arrangement direction is substantially the same as the length of the heater 22 in the arrangement direction. Both side walls 23*b*1 forming the recessed portion 23*b* in the arrangement direction restrict movement of the heater 22 and movement of the first high thermal conduction member 28 in the arrangement direction and work as arrangement direction regulators. Reducing the positional deviation of the first high thermal conduction member 28 in the arrangement direction in the fixing device 9 improves the thermal conductivity efficiency with respect to a target range in the arrangement direction. In addition, both side walls 23*b*2 forming the recessed portion 23*b* in the direction intersecting the arrangement direction restricts movement of the heater 22 and movement of the first high thermal conduction member 28 in the direction intersecting the arrangement direction.

Figure 24:
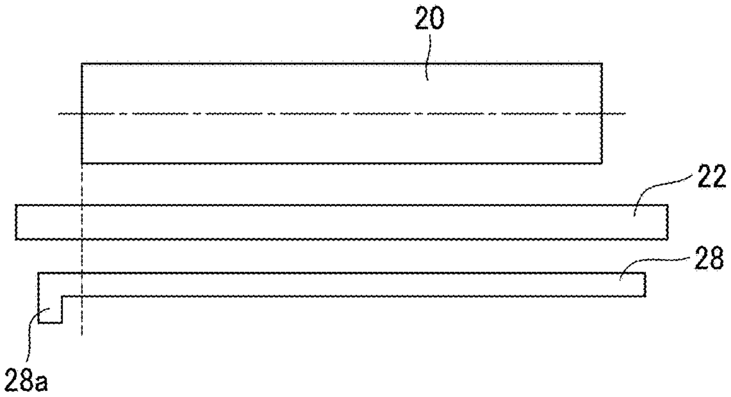
FIG. 24 is a schematic diagram illustrating a positional relationship among the first high thermal conduction member, a fixing belt, and the heater in a longitudinal direction of the heater.

The above-described discharging brush 37 may be brought into contact with the first high thermal conduction member 28. For example, as illustrated in FIG. 24, the first high thermal conduction member 28 includes a contacted portion 28*a* on one side of the first high thermal conduction member, the one side facing the heater holder 23, and the contacted portion 28*a* is at one end of the one side in the arrangement direction. The contacted portion 28*a* is disposed outside one end of the fixing belt 20 in the widthwise direction and is a bent portion bent from the first high thermal conduction member 28 in the direction intersecting the arrangement direction. However, the shape of the contacted portion 28*a* is not limited to this.

Figure 25:
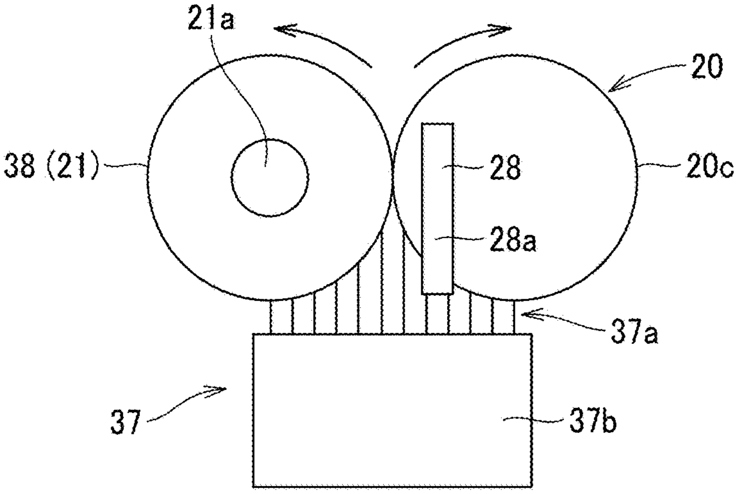
FIG. 25 is a side view of the discharging brush in contact with the conductor, a surface layer of the fixing belt, and the first high thermal conduction member.

As illustrated in FIG. 25, the contact portion 37*a* of the discharging brush 37 comes into contact with the exposed portion 21*a*1 of the core 21*a*, the surface layer of the fixing belt 20, and the contacted portion 28*a* of the first high thermal conduction member 28 to remove charges from the exposed portion 21*a*1, the surface layer, and the first high thermal conduction member 28.

Similar to the above-described embodiments, the conductor 38 in the present embodiment shortens the length of the hair of the discharging brush 37 to remove the electric charge from the core 21*a*, and the contacted portion 28*a* disposed on the first high thermal conduction member 28 in the present embodiment shortens a length of the hair of the discharging brush 37 to remove the electric charge from the first high thermal conduction member 28. The above-described configuration enables the contact portion 37*a* to stably contact the conductor 38, the contacted portion 28*a*, and the surface layer of the fixing belt 20 and remove the electric charge from the core 21*a*, the first high thermal conduction member 28, and the surface layer 21*c*. The contacted portion 28*a* of the first high thermal conduction member 28 is not limited to the contacted portion integrally formed with the first high thermal conduction member 28 and may be formed by another thermal conduction member.

Figure 26:
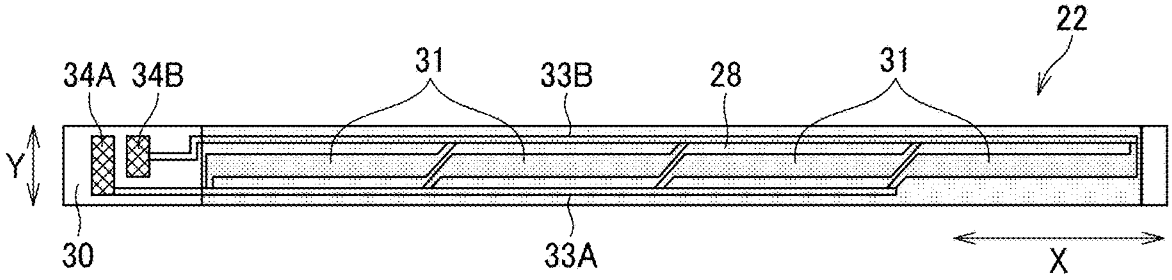
FIG. 26 is a plan view of the heater to illustrate a setting of the first high thermal conduction members.
Figure 27:
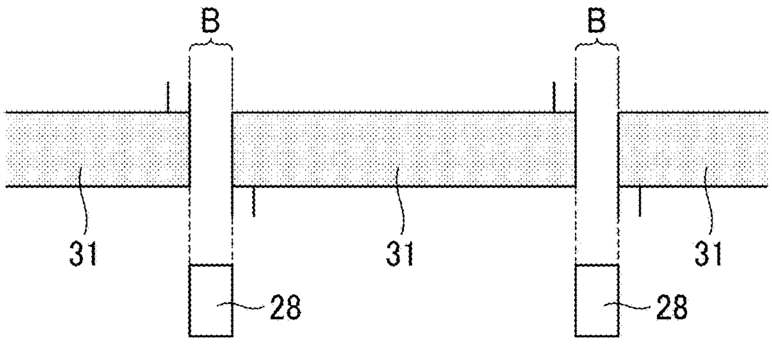
FIG. 27 is a schematic diagram illustrating another example of the setting of the first high thermal conduction members in the heater.
Figure 28:
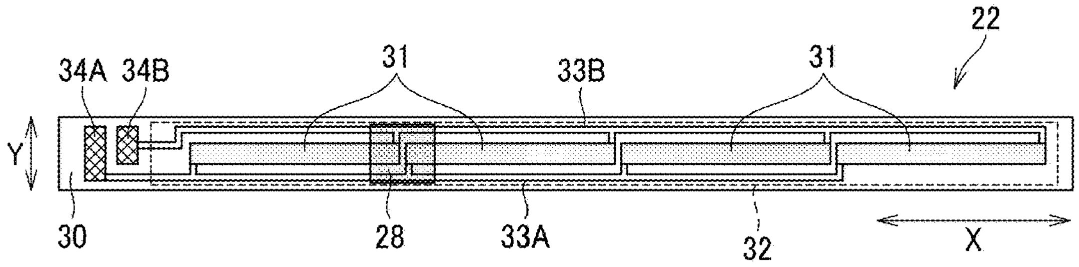
FIG. 28 is a plan view of the heater having a further different setting of the first high thermal conduction member.

The range in which the first high thermal conduction member 28 is disposed in the arrangement direction is not limited to the above. For example, as illustrated in FIG. 26, the first high thermal conduction member 28 may be disposed so as to face a range corresponding to the heat generation portion 35 in the arrangement direction (see a hatched portion in FIG. 26). As illustrated in FIG. 27, the first high thermal conduction members 28 may face the entire gap area between the resistive heat generators 31. In FIG. 27, for the sake of convenience, the resistive heat generator 31 and the first high thermal conduction member 28 are shifted in the vertical direction of FIG. 27 but are disposed at substantially the same position in the direction intersecting the arrangement direction. However, the present disclosure is not limited to the above. The first high thermal conduction member 28 may be disposed to face a part of the resistive heat generators 31 in the direction intersecting the arrangement direction or may be disposed so as to cover the entire resistive heat generators 31 in the direction intersecting the arrangement direction as illustrated in FIG. 28, which is described below. As illustrated in FIG. 28, the first high thermal conduction member 28 may face a part of each of the neighboring resistive heat generators 31 in addition to the gap area between the neighboring resistive heat generators 31. The first high thermal conduction member 28 may be disposed to face all separation areas B in the heater 22, one separation area B as illustrated in FIG. 28, or some of separation areas B. At least a part of the first high thermal conduction member 28 may be disposed to face the separation area B.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency of the heaters 22 in the arrangement direction. The first high thermal conduction member 28 facing the separation area B improves the heat conduction efficiency of a part of the heater 22 facing the separation area B in the arrangement direction, transmits heat to the part of the heater 22 facing the separation area B, and raises the temperature of the part of the heater 22 facing the separation area B. As a result, the first high thermal conduction member 28 reduces the temperature unevenness in the arrangement direction of the heaters 22. Thus, temperature unevenness in the arrangement direction of the fixing belt 20 is reduced. Therefore, the above-described structure prevents fixing unevenness and gloss unevenness in the image fixed on the sheet. Since the heater 22 does not need to generate additional heat to secure sufficient fixing performance in the part of the heater 22 facing the separation area B, energy consumption of the fixing device 9 can be saved. The first high thermal conduction member 28 disposed over the entire area of the heat generation portion 35 in the arrangement direction improves the heat transfer efficiency of the heater 22 over the entire area of a main heating region of the heater 22 (that is, an area facing an image formation area of the sheet passing through the fixing device) and reduces the temperature unevenness of the heater 22 and the temperature unevenness of the fixing belt 20 in the arrangement direction.

In the present embodiment, the combination of the first high thermal conduction member 28 and the resistive heat generator 31 having the PTC characteristic described above efficiently prevents overheating of a non-sheet passing region (that is the region of the fixing belt outside the small sheet) of the fixing belt 20 when small sheets pass through the fixing device 9. Specifically, the PTC characteristic reduces the amount of heat generated by the resistive heat generator 31 in the non-sheet passing region, and the first high thermal conduction member effectively transfers heat from the non-sheet passing region in which the temperature rises to a sheet passing region that is a region of the fixing belt contacting the sheet. As a result, the overheating of the non-sheet passing region is effectively prevented.

The first high thermal conduction member 28 may be disposed opposite an area around the separation area B because the small heat generation amount in the separation area B decreases the temperature in the area around the separation area B. For example, the first high thermal conduction member 28 facing the enlarged separation area C as illustrated in FIG. 20 particularly improves the heat transfer efficiency of the separation area B and the area around the separation area B in the arrangement direction and reduces the temperature unevenness of the heaters 22 in the arrangement direction. In particular, the first high thermal conduction member 28 facing the entire region of the heat generation portion 35 in the arrangement direction reduces the temperature unevenness of the heater 22 (and the fixing belt 20) in the arrangement direction.

Next, different embodiments of the fixing device are described.

Figure 29:
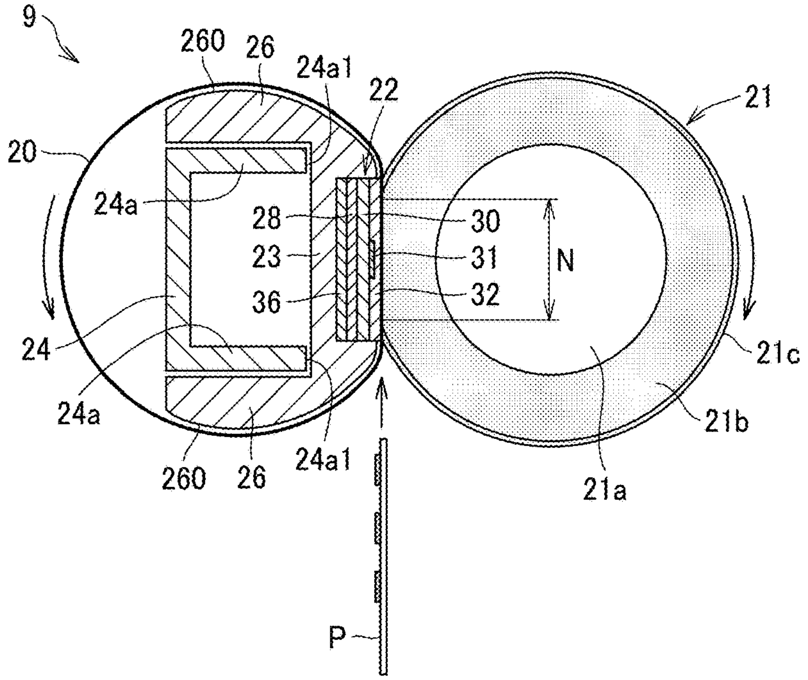
FIG. 29 is a schematic sectional side view of the fixing device according to an embodiment different from FIG. 2.

As illustrated in FIG. 29, the fixing device 9 according to the present embodiment includes a second high thermal conduction member 36 between the heater holder 23 and the first high thermal conduction member 28. The second high thermal conduction member 36 is disposed at a position different from the position of the first high thermal conduction member 28 in the lateral direction in FIG. 29 that is a direction in which the heater holder 23, the stay 24, and the first high thermal conduction member 28 are layered. Specifically, the second high thermal conduction member 36 is disposed so as to overlap the first high thermal conduction member 28. FIG. 29 illustrates a schematic cross section of the fixing device 9 including the second high thermal conduction member 36 that transmits heat in the arrangement direction, and the position of the schematic cross section is different from the position of the thermistor 25 illustrated in FIG. 2.

The second high thermal conduction member 36 is made of a material having thermal conductivity higher than the thermal conductivity of the base 30, for example, graphene or graphite. In the present embodiment, the second high thermal conduction member 36 is made of a graphite sheet having a thickness of 1 mm. Alternatively, the second high thermal conduction member 36 may be a plate made of aluminum, copper, silver, or the like.

Figure 30:
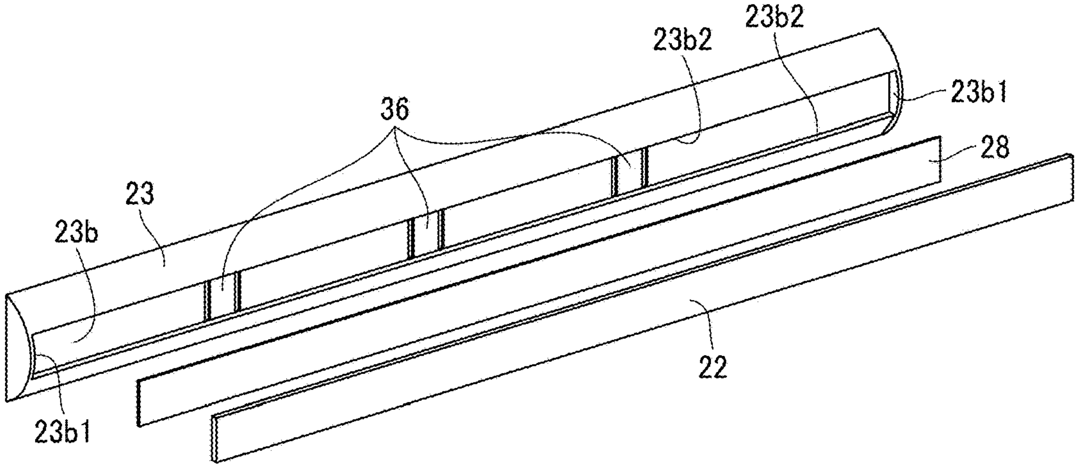
FIG. 30 is a perspective view of the heater, the first high thermal conduction member, a second high thermal conduction member, and the heater holder.

As illustrated in FIG. 30, a plurality of the second high thermal conduction members 36 are disposed on a plurality of portions of the heater holder 23 in the arrangement direction. The recessed portion 23*b* of the heater holder 23 has a plurality of holes in which the second high thermal conduction members 36 are disposed. Clearances are formed between the heater holder 23 and both sides of the second high thermal conduction member 36 in the arrangement direction. The clearance prevents heat transfer from the second high thermal conduction member 36 to the heater holder 23, and the heater 22 can efficiently heat the fixing belt 20. In FIG. 30, the guide 26 in FIG. 2 is omitted.

Figure 31:
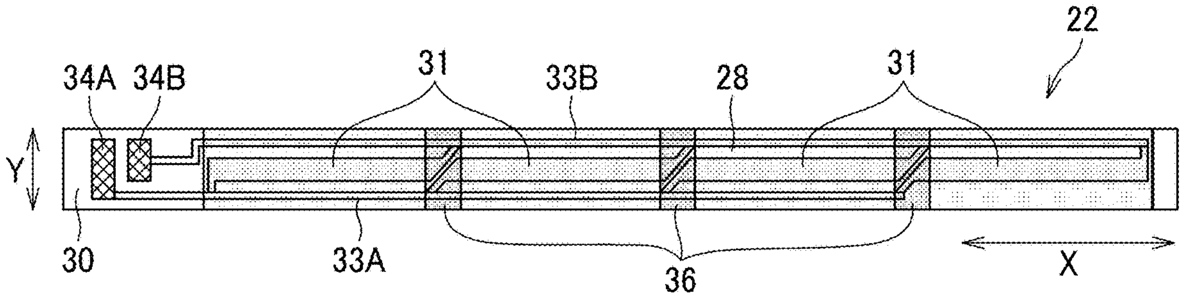
FIG. 31 is a plan view of the heater to illustrate an arrangement of the first high thermal conduction member and the second high thermal conduction member.

As illustrated in FIG. 31, each of the second high thermal conduction members 36 (see the hatched portions) is disposed at a position corresponding to the separation area B in the arrangement direction and faces at least a part of each of the neighboring resistive heat generators 31 in the arrangement direction. In particular, each of the second high thermal conduction members 36 in the present embodiment faces the entire separation area B. In FIG. 31 (and FIG. 35 to be described later), the first high thermal conduction member 28 faces the heat generation portion 35 extending in the arrangement direction, but the first high thermal conduction member 28 according to the present embodiment is not limited this as described above.

Figure 32:
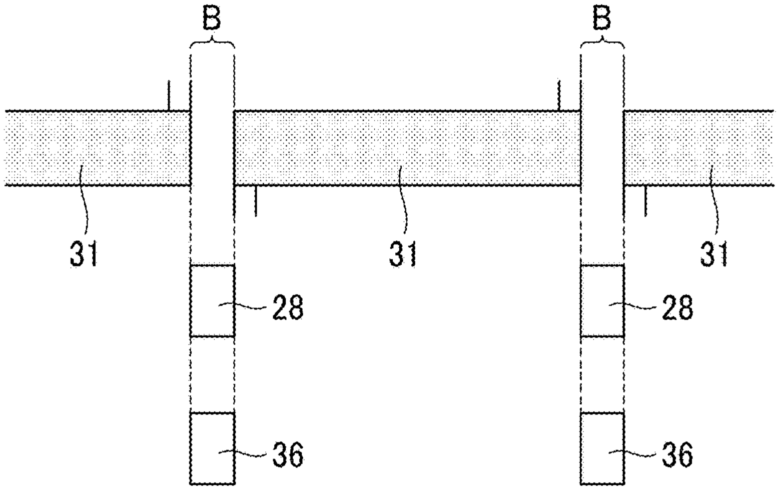
FIG. 32 is a schematic diagram illustrating a different arrangement of the first high thermal conduction members and the second high thermal conduction members from the arrangement in FIG. 31.

The fixing device 9 according to the present embodiment includes the second high thermal conduction member 36 disposed at the position corresponding to the separation area B in the arrangement direction and the position at which at least a part of each of the neighboring resistive heat generators 31 faces the second high thermal conduction member 36 in addition to the first high thermal conduction member 28. The above-described structure particularly improves the heat transfer efficiency in the separation area B in the arrangement direction and further reduces the temperature unevenness of the heater 22 in the arrangement direction. As illustrated in FIG. 32, the first high thermal conduction members 28 and the second high thermal conduction member 36 may be disposed opposite the entire gap area between the resistive heat generators 31. The above-described structure improves the heat transfer efficiency of the part of the heater 22 corresponding to the gap area to be higher than the heat transfer efficiency of the other part of the heater 22. In FIG. 32, for the sake of convenience, the resistive heat generator 31, the first high thermal conduction member 28, and the second high thermal conduction member 36 are shifted in the vertical direction of FIG. 32 but are disposed at substantially the same position in the direction intersecting the arrangement direction. However, the present disclosure is not limited to the above. The first high thermal conduction member 28 and the second high thermal conduction member 36 may be disposed opposite a part of the resistive heat generators 31 in the direction intersecting the arrangement direction or may be disposed so as to cover the entire resistive heat generators 31 in the direction intersecting the arrangement direction.

In one embodiment different from the embodiments described above, each of the first high thermal conduction member 28 and the second high thermal conduction member 36 is made of a graphene sheet. The first high thermal conduction member 28 and the second high thermal conduction member 36 made of the graphene sheet have high thermal conductivity in a predetermined direction along the plane of the graphene, that is, not in the thickness direction but in the arrangement direction. Accordingly, the above-described structure can effectively reduce the temperature unevenness of the fixing belt 20 in the arrangement direction and the temperature unevenness of the heater 22 in the arrangement direction.

Figure 33:
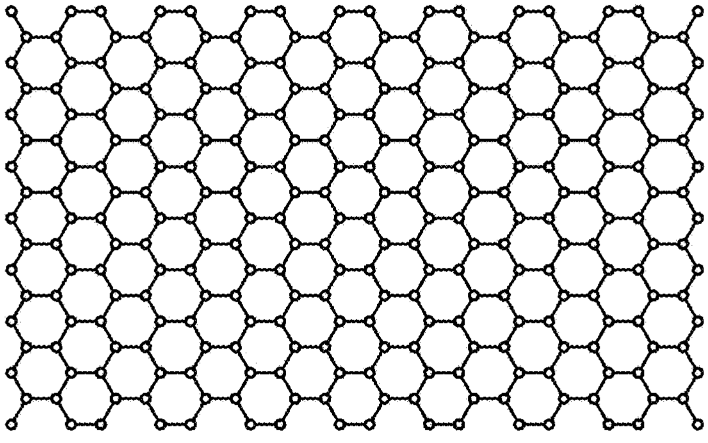
FIG. 33 is a schematic diagram illustrating a two dimensional atomic crystal structure of graphene.

Graphene is a flaky powder. Graphene has a planar hexagonal lattice structure of carbon atoms, as illustrated in FIG. 33. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 34:
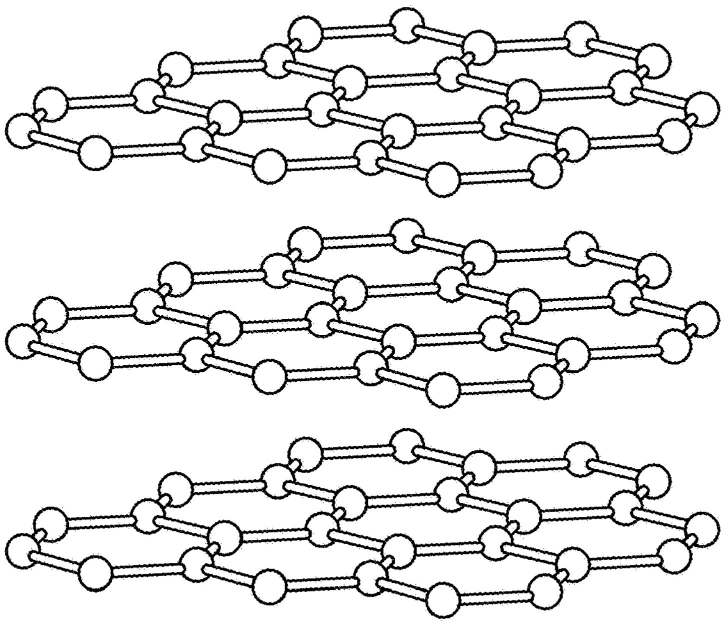
FIG. 34 is a schematic diagram illustrating a three dimensional atomic crystal structure of graphite.

Graphite obtained by multilayering graphene has a large thermal conduction anisotropy. As illustrated in FIG. 34, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 28 and the second high thermal conduction member 36 that are made of graphite each have the heat transfer efficiency in the arrangement direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

Figure 35:
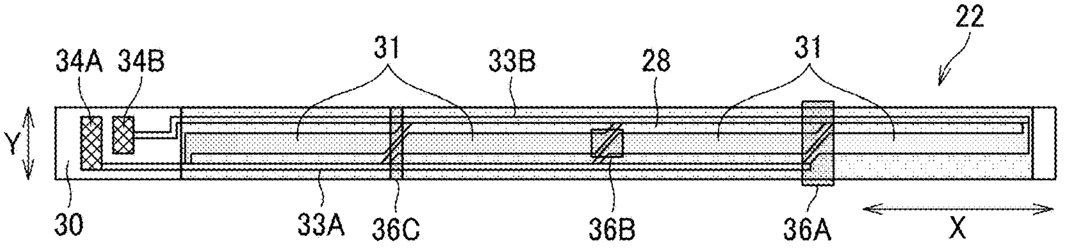
FIG. 35 is a plan view of the heater having a different arrangement of the second high thermal conduction member from the arrangement in FIG. 31.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 31. For example, as illustrated in FIG. 35, a second high thermal conduction member 36A is longer than the base 30 in the direction intersecting the arrangement direction, and both ends of the second high thermal conduction member 36A in the direction intersecting the arrangement direction are outside the base 30 in FIG. 35. A second high thermal conduction member 36B faces a range in which the resistive heat generator 31 is disposed in the direction intersecting the arrangement direction. A second high thermal conduction member 36C faces a part of the gap area and a part of each of neighboring resistive heat generators 31.

Figure 36:
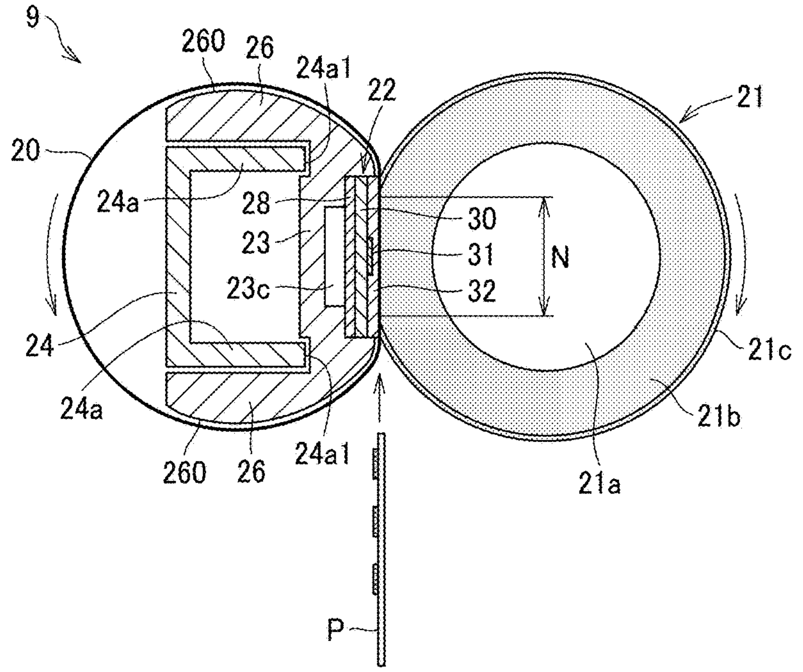
FIG. 36 is a schematic sectional view of the fixing device different from the fixing devices illustrated in FIGS. 2 and 29.

As illustrated in FIG. 36, the fixing device according to the present embodiment has a gap between the first high thermal conduction member 28 and the heater holder 23 in the thickness direction that is the lateral direction in FIG. 36. In other words, the fixing device 9 has a gap 23*c* serving as a thermal insulation layer. In the arrangement direction, the gap 23*c* is in a portion included in the recessed portion 23*b* (see FIG. 30) in the heater holder 23 to set the first high thermal conduction member 28 and the second high thermal conduction member 36 but the portion in which the second high thermal conduction member 36 is not set. In the direction intersecting the arrangement direction, the gap 23*c* is in a portion of the recessed portion 23*b* having a depth deeper than other portions to receive the first high thermal conduction member 28. The above-described structure minimizes the contact area between the heater holder 23 and the first high thermal conduction member 28. Minimizing the contact area prevents heat transfer from the first high thermal conduction member 28 to the heater holder 23 and enables the heater 22 to efficiently heat the fixing belt 20. In the cross section of the fixing device 9 in which the second high thermal conduction member 36 is set, the second high thermal conduction member 36 is in contact with the heater holder 23 as illustrated in FIG. 29 of the above-described embodiment.

In particular, the fixing device 9 according to the present embodiment has the gap 23*c* facing the entire area of the resistive heat generators 31 in the direction intersecting the arrangement direction that is the vertical direction in FIG. 36. The gap 23*c* prevents heat transfer from the first high thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the present embodiment is not limited to this. For example, the first high thermal conduction member 28 may have a thicker portion than the other portion so that the thicker portion faces the separation area B.

The discharging brush 37 in the above-described embodiments as illustrated in FIG. 3 and the like may be also brought into contact with the conductor 38 included in the pressure roller 21 as the first rotator in the embodiment as illustrated in FIGS. 29 and 36 similar to the above-described embodiments regarding the discharging brush 37. The above-described configuration enables the common discharging brush 37 to remove the electric charge from both of the core 21*a* and the surface layer 21*c*. In addition, the above-described configuration enables the discharging brush 37 to stably comes into contact with the discharged member and stably remove the electric charges of the first layer and the third layer of the first rotator.

Figure 37:
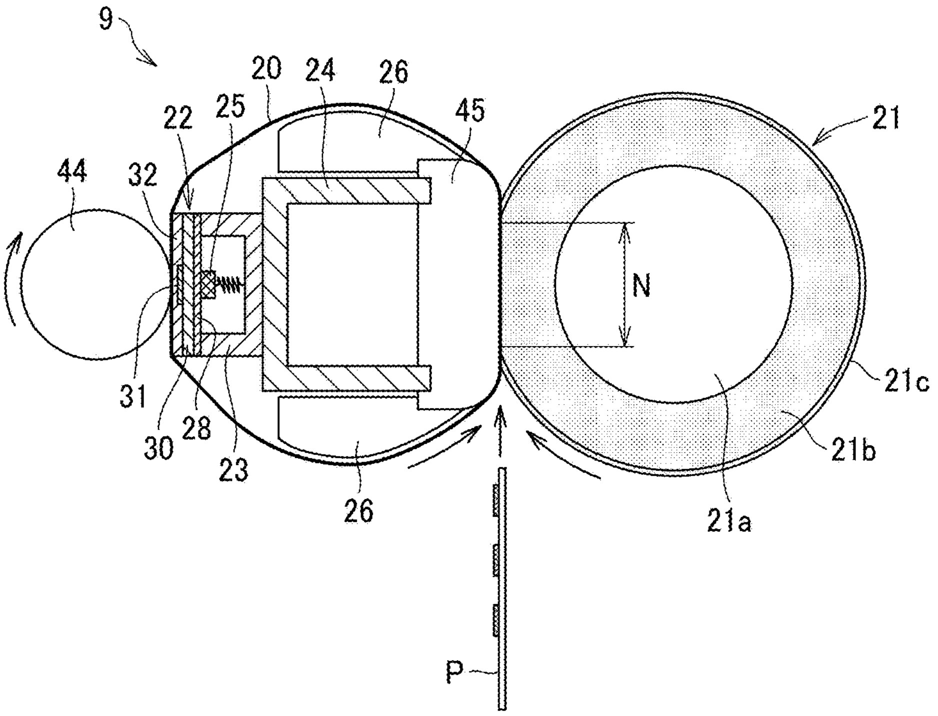
FIG. 37 is a schematic sectional side view of the fixing device different from the fixing devices of FIGS. 2, 29, and 36.
Figure 38:
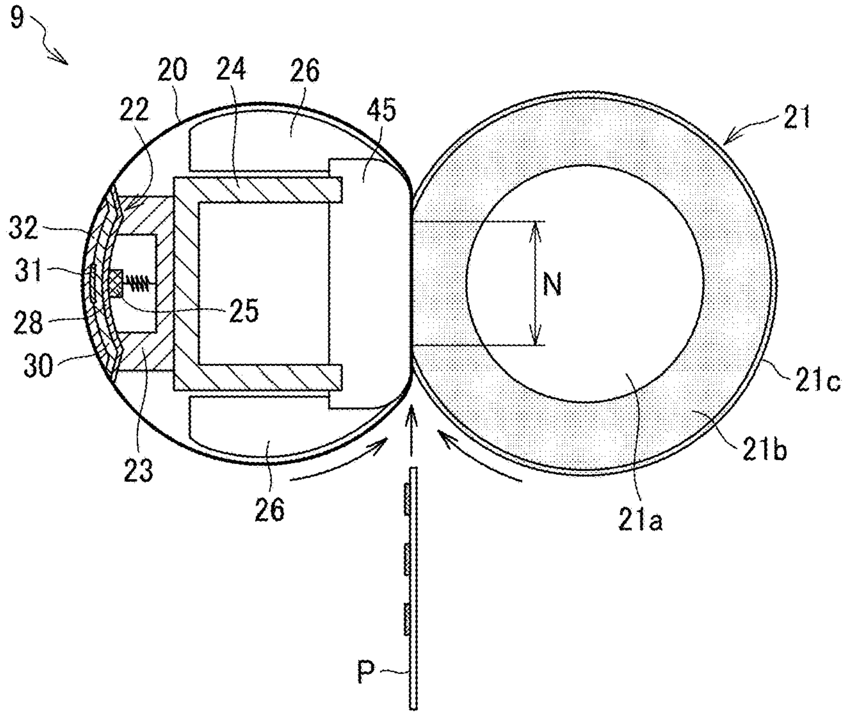
FIG. 38 is a schematic sectional view of the fixing device different from the fixing devices of FIGS. 2, 29, 36, and 37.
Figure 39:
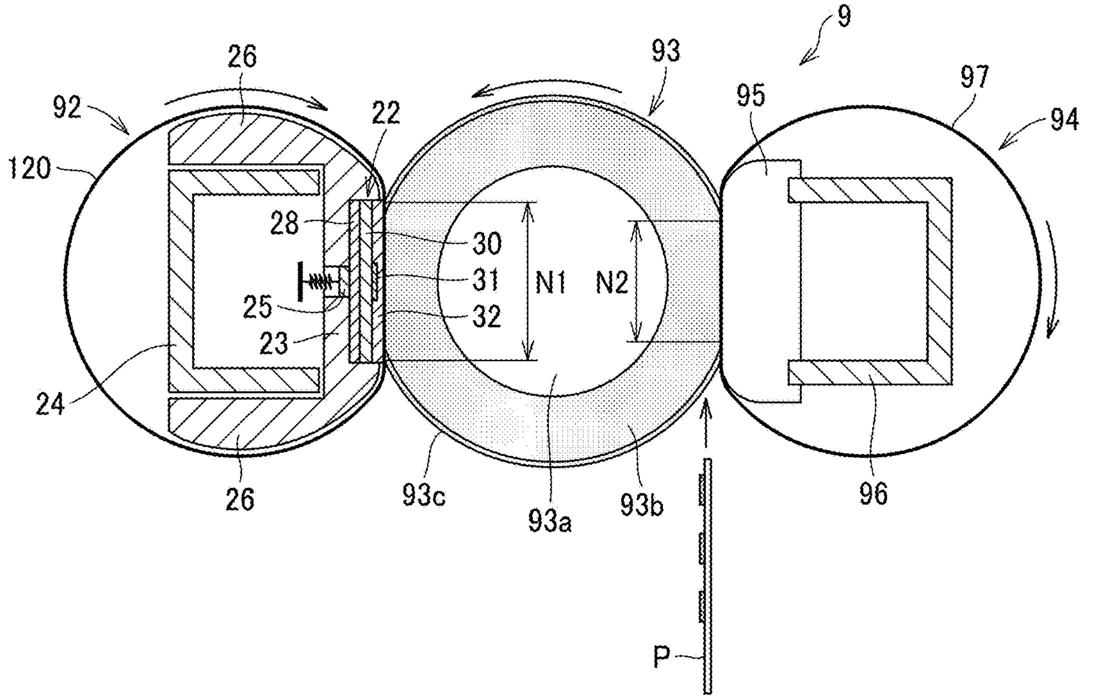
FIG. 39 is a schematic sectional side view of the fixing device different from the fixing devices of FIGS. 2, 29, and 36 to 38.

The embodiments of the present disclosure are also applicable to fixing devices as illustrated in FIGS. 37 to 39, respectively, in addition to the fixing device 9 described above. Hereinafter, the configuration of each fixing device illustrated in FIGS. 37 to 39 are briefly described.

First, the fixing device 9 illustrated in FIG. 37 includes a pressurization roller 44 opposite the pressure roller 21 with respect to the fixing belt 20. The pressurization roller 44 is the second rotator that rotates and is opposite the fixing belt 20 as the first rotator. The fixing belt 20 is sandwiched by the pressurization roller 44 and the heater 22 and heated by the heater 22. On the other hand, a nip formation pad 45 serving as a nip former is disposed inside the loop formed by the fixing belt 20 and disposed opposite the pressure roller 21. The nip formation pad 45 is supported by the stay 24. The nip formation pad 45 sandwiches the fixing belt 20 together with the pressure roller 21, thereby forming the fixing nip N.

A description is provided of the construction of the fixing device 9 as illustrated in FIG. 38. The fixing device 9 does not include the pressurization roller 44 described above with reference to FIG. 37. In order to attain a contact length for which the heater 22 contacts the fixing belt 20 in the circumferential direction thereof, the heater 22 is curved into an arc in cross section that corresponds to a curvature of the fixing belt 20. Other parts of the fixing device 9 illustrated in FIG. 38 are the same as the fixing device 9 illustrated in FIG. 37.

In the embodiments illustrated in FIGS. 37 and 38, the pressure roller 21 as the first rotator may also include the conductor 38 in the above-described embodiments as illustrated in FIG. 3 and the like to be brought into contact with the discharging brush 37. The above-described configuration enables the common discharging brush 37 to remove the electric charge from both of the core 21*a* and the surface layer 21*c*. As a result, the above-described configuration can reduce the number of components of the fixing device, resulting in a reduction in the cost and the reduction in the size of the fixing device. In addition, the above-described configuration enables the discharging brush 37 to stably come into contact with the discharged member and stably remove the electric charges of the first layer and the third layer of the first rotator. The discharging brush may be brought into contact with the conductor included in the fixing belt 20 having a configuration in which the fixing belt 20 includes the base as the first layer and the surface layer as the third layer that are not electrically connected each other by the second layer that is between the first layer and the third layer and not electrically conductive, such as the elastic layer.

Finally, the fixing device 9 illustrated in FIG. 39 is described. The fixing device 9 includes a heating assembly 92, a fixing roller 93 that is a fixing member, and a pressure assembly 94 that is a facing member. The heating assembly 92 includes the heater 22, the first high thermal conduction member 28, the heater holder 23, the stay 24, which are described in the above embodiments, and a heating belt 120 as the first rotator. The fixing roller 93 is the second rotator that rotates while facing the heating belt 120 as the first rotator. The fixing roller 93 includes a core 93*a* as the first layer, an elastic layer 93*b* as the second layer, and a surface layer 93*c* as the third layer. The core 93*a* is electrically conductive. The elastic layer 93*b* is not electrically conductive. The surface layer 93*c* is electrically conductive. The pressure assembly 94 is opposite to the heating assembly 92 with respect to the fixing roller 93. The pressure assembly 94 includes a nip formation pad 95 and a stay 96 inside the loop of a pressure belt 97, and the pressure belt 97 is rotatably arranged to wrap around the nip formation pad 95 and the stay 96. The sheet P passes through the fixing nip N2 between the pressure belt 97 and the fixing roller 93 to be heated and pressed to fix the image onto the sheet P.

The fixing device illustrated in FIG. 39 may include the conductor 38 and the discharging brush 37 that are described above to remove the electric charge from the fixing roller 93 as the first rotator. The above-described configuration enables the common discharging brush 37 to remove the electric charge from both of the core 93*a* and the surface layer 93*c*. As a result, the above-described configuration can reduce the number of components of the fixing device, resulting in a reduction in the cost and the reduction in the size of the fixing device. In addition, the above-described configuration enables the discharging brush 37 to stably come into contact with the discharged member and stably remove the electric charges of the first layer and the third layer of the first rotator. The conductor 38 and the discharging brush 37 may remove the electric charge from the heating belt 120 or the pressure belt 97 each having a configuration including the base as the first layer and the surface layer as the third layer that are not electrically connected each other by the second layer that is between the first layer and the third layer and not electrically conductive, such as the elastic layer.

Figure 40:
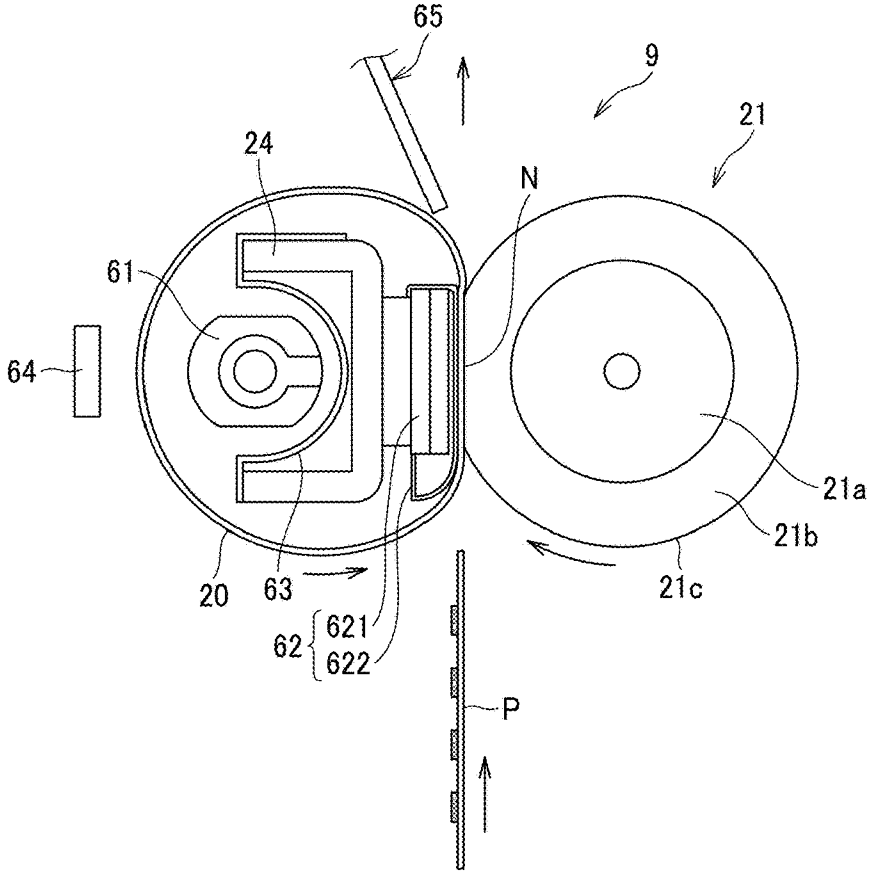
FIG. 40 is a schematic sectional side view of the fixing device different from the fixing devices of FIGS. 2, 29, and 36 to 39.

The fixing device to which the present disclosure is applied is not limited to the fixing device including the planar heater described above. For example, as illustrated in FIG. 40, the fixing device 9 according to the present embodiment includes a halogen heater 61 as the heating member. The fixing device 9 includes the fixing belt 20, the pressure roller 21 as the first rotator, a nip formation pad 62, the stay 24, a reflector 63, temperature sensors 64, and a separator 65.

Both ends of the halogen heater 61 in the longitudinal direction of the halogen heater 61 are fixed to the side plates. The heating member of the fixing device according to the present embodiment may be an induction heating (IH) heater or a carbon heater other than the halogen heater. The fixing device 9 may include a plurality of halogen heaters having different heating regions in the longitudinal direction.

The nip formation pad 62 includes a base pad 621 and a sliding sheet 622 disposed on the surface of the base pad 621. The base pad 621 is disposed in the longitudinal direction and receives the pressing force of the pressure roller 21 to determine the shape of the fixing nip N. The stay 24 supports and fixes the base pad 621. The stay 24 prevents the nip formation pad 62 from being bent by the pressure from the pressure roller 21 to form the fixing nip having a uniform width along the axial direction of the pressure roller 21. In the present embodiment, an opposed face of the base pad 621 disposed opposite the pressure roller 21 via the fixing belt 20 is planar to produce the linear fixing nip that reduces pressure exerted to the base pad 621 by the pressure roller 21.

The base pad 621 is made of a rigid, heat-resistant material having an increased mechanical strength and a heat resistance against temperatures not lower than 200° C. Thus, the nip formation pad 62 is immune to thermal deformation at temperatures in a fixing temperature range desirable to fix the toner image on the sheet P, thereby retaining the shape of the fixing nip N and quality of the toner image formed on the sheet P. For example, the base pad 621 is made of general heat-resistant resin such as polyether sulfone (PES), polyphenylene sulfide (PPS), liquid crystal polymer (LCP), polyether nitrile (PEN), polyamide imide (PAI), and polyether ether ketone (PEEK), metal, ceramic, or the like.

The sliding sheet 622 is disposed on a surface of the base pad 621 facing at least the fixing belt 20. Thus, the base pad 621 indirectly contacts the fixing belt 20 via the sliding sheet 622. During the rotation of the fixing belt 20, the fixing belt 20 slides on the sliding sheet 622, which reduces the frictional force generated in the fixing belt 20 and the driving torque of the fixing belt 20. The fixing device may not include the sliding sheet 622.

The reflector 63 is interposed between the stay 24 and the halogen heater 61. In the present embodiment, the reflector 63 is secured to the stay 24. As a material of the reflector 63, aluminum, stainless steel, or the like may be used. With the reflector 63 located as described above, the light emitted from the halogen heater 61 toward the stay 24 is reflected to the fixing belt 20. Such reflection by the reflector 63 increases an amount of light that irradiates the fixing belt 20, thereby heating the fixing belt 20 efficiently. In addition, the reflector 63 prevents transmitting radiant heat from the halogen heater 61 to the stay 24 and the like, thus saving energy.

The fixing device applies heat and pressure to the sheet passing through the fixing nip N to fix the image onto the surface of the sheet. The sheet having passed through the fixing nip N is separated from the fixing belt 20 by the separator 65.

Figure 41A:
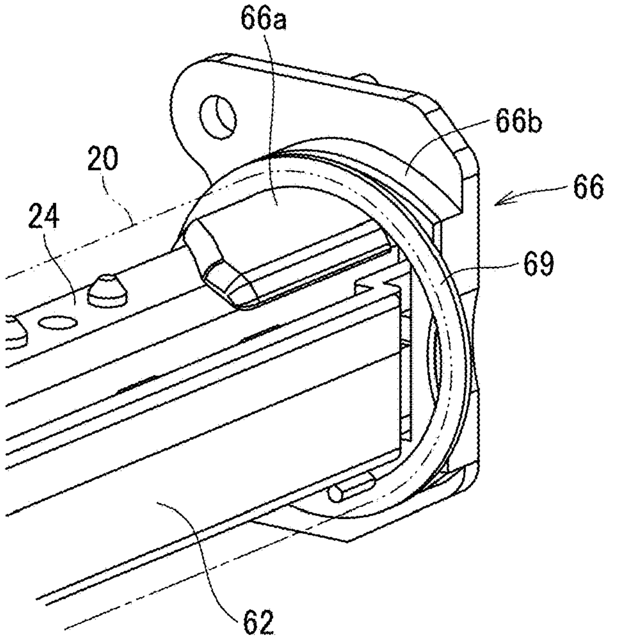
FIG. 41A is a perspective view of a supporting structure to support an end portion of the fixing belt of FIG. 40.
Figure 41B:
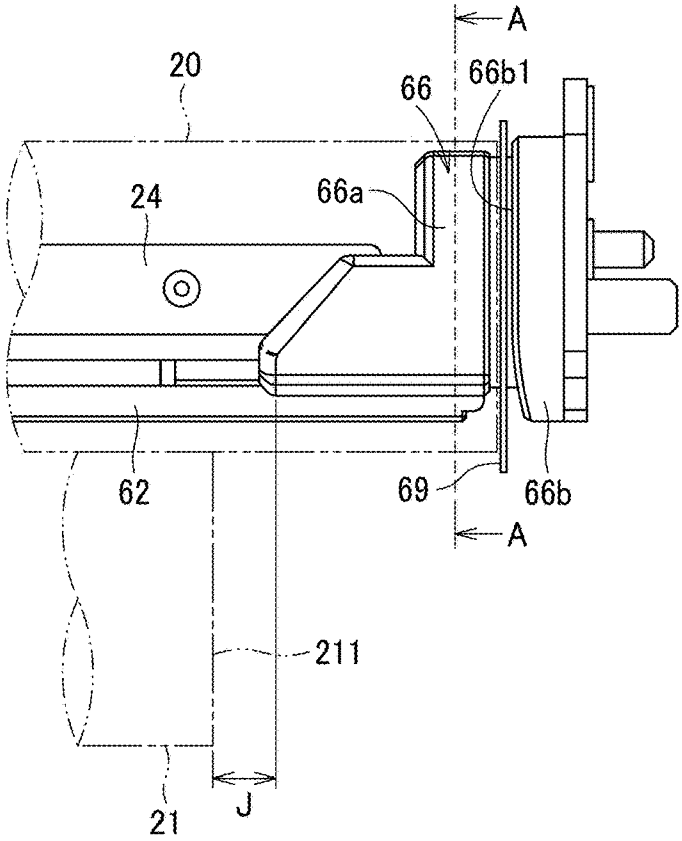
FIG. 41B is a plan view of the supporting structure of FIG. 41A.
Figure 41C:
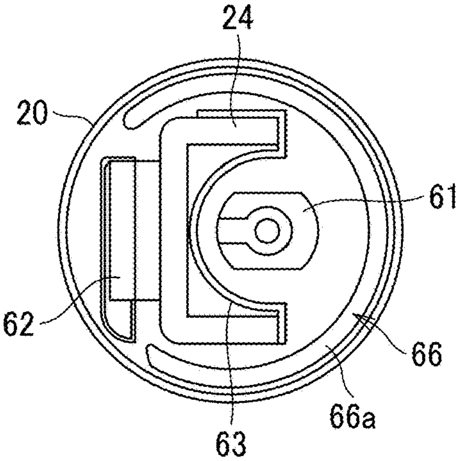
FIG. 41C is a cross-sectional view of the supporting structure taken along line A-A of FIG. 41B.

With reference to FIGS. 41A to 41C, the following describes a support structure to support both ends of the fixing belt 20 in the longitudinal direction. The support structure includes belt holders 66 inserted in both ends of the fixing belt 20 to rotatably support the fixing belt 20. After the belt holders 66 are assembled to the side plates of the fixing device 9, the fixing device 9 is installed to the image forming apparatus. FIGS. 41A to 41C illustrate the belt holder 66 on one end of the fixing device 9, but the belt holder 66 is on the other end of the fixing device 9. Since the belt holders 66 have the same configuration, the belt holder 66 on the one end is described below.

As illustrated in FIGS. 41A and 41B, the belt holder 66 includes a tube 66*a* having a cylindrical outer peripheral surface and a flange 66*b* radially protruding outward from the tube 66*a* to restrict movement of the fixing belt 20 in the longitudinal direction. The belt holder 66 is integrally formed by, for example, injection molding of resin. As illustrated in FIG. 41C, the tube 66*a* of the belt holder 66 has a C-shaped cross section having an opening extending in the longitudinal direction. The opening is at a position of the fixing nip. The nip formation pad 62 is disposed in the opening. The tube 66*a* of the belt holder 66 is loosely fitted to the inner peripheral surface of the fixing belt 20 to rotatably hold the end of the fixing belt 20. An end of the stay 24 is fixed and positioned to the belt holder 66.

As illustrated in FIGS. 41A and 41B, a slip ring 69 as a protector to protect the one end of the fixing belt 20 is disposed between the one end of the fixing belt 20 and an edge surface 66*b*1 of the flange 66*b*. The edge surface 66*b*1 of the belt holder 66 is a surface facing the one end of the fixing belt 20 in the longitudinal direction. The slip ring 69 prevents the end of the fixing belt 20 shifted in the longitudinal direction from directly contacting an end surface 401 of the flange 66*b* of the belt holder 66 to prevent damage and abrasion of the end of the fixing belt 20.

In the above-described support structure, since the belt holders 66 hold both ends of the fixing belt 20 and do not hold another part of the fixing belt 20, the fixing belt 20 is deformable in said another part except for the fixing nip N.

As illustrated in FIG. 41B, the pressure roller 21 and the belt holder 66 are arranged at different positions in the axial direction of the pressure roller 21 not to overlap each other in the axial direction. Specifically, a distal end of the belt holder 66 is away from an end 211 of the pressure roller 21 in the axial direction. The above-described configuration forms a longitudinal region J in which the fixing belt 20 is not in contact with both the pressure roller 21 and the belt holder 66, and the longitudinal region J relaxes stress concentration in the vicinity of the end of the fixing belt 20.

Figure 42:
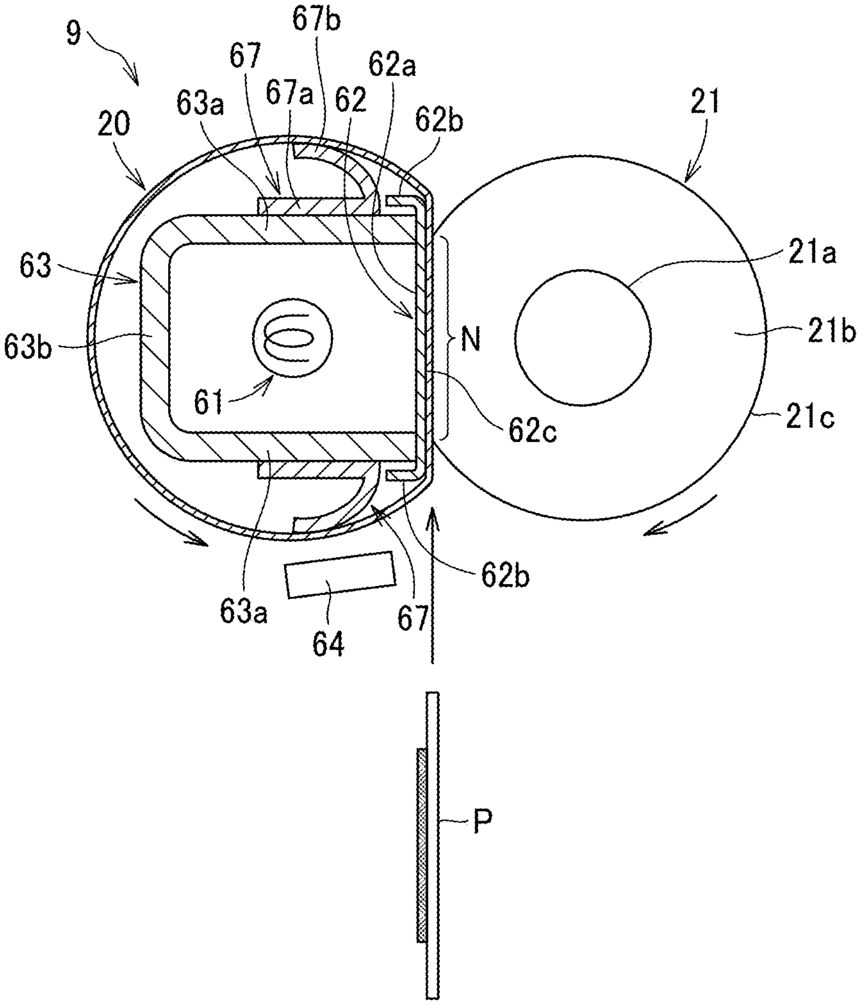
FIG. 42 is a schematic sectional side view of the fixing device different from the fixing devices of FIGS. 2, 29, and 36 to 40.

In the fixing device 9 illustrated in FIG. 42, the halogen heater 61 heats the nip formation pad 62. The fixing device 9 includes the fixing belt 20, the pressure roller 21 as the first rotator, the nip formation pad 62, the reflector 63, guides 67, the temperature sensors 64.

The nip formation pad 62 includes a nip formation portion 62*a* that is a plate to contact the inner circumferential surface of the fixing belt 20 and a pair of bent portions 24*b* that are bent from both end portions of the nip formation portion 62*a* in a belt rotation direction of the fixing belt 20 to the opposite side to the pressure roller 21.

A nip formation surface 62*c* on the nip formation portion 62*a* facing the fixing belt 20 is in direct contact with the inner circumferential surface of the fixing belt 20. As a result, when the fixing belt 20 rotates, the fixing belt 20 slides on the nip formation surface 62*c*. In order to improve the abrasion resistance and the slidability of the nip formation surface 62*c*, the nip formation surface 62*c* may be treated with alumite or coated with fluororesin material. Additionally, a lubricant such as a fluorine-based grease may be applied to the nip formation surface 62*c* to ensure slidability over time. In the present embodiment, the nip formation surface 62*c* is planar. Alternatively, the nip formation surface 62*c* may define a recess or other shape. For example, the nip formation surface 62*c* having a concave shape recessed to the side opposite to the pressure roller 21 leads the outlet of the sheet in the fixing nip N to be closer to the pressure roller 21, which improves separation of the sheet from the fixing belt 20.

The reflector 63 reflects the radiant heat that is the infrared light from the halogen heater 61, and at least a part of the reflector 63 is interposed between the fixing belt 20 and the halogen heater 61 in a cross-section that intersects the longitudinal direction of the fixing belt 20. Similar to the nip formation pad 62, the reflector 63 extends in the longitudinal direction and is disposed inside the loop of the fixing belt 20. In the present embodiment, the reflector 63 has a U-shaped cross-section including a pair of side walls 63*a* and a bottom wall 63*b* that couples the pair of side walls 63*a*. The pair of side walls 63*a* of the reflector 63 supports both ends of the nip formation pad 62 in the belt rotation direction of the fixing belt 20. The side walls 63*a* extending in a pressure direction in which the pressure roller 21 presses the nip formation pad 62 strengthens the rigidity of the reflector 63 in the pressure direction and reduces the bend of the nip formation portion 62*a* caused by the pressure force of the pressure roller 21. The above-described configuration results in a uniform width of the fixing nip N in the longitudinal direction. The reflector 63 is preferably made of an iron-based metal such as steel use stainless (SUS) or Steel Electrolytic Cold Commercial (SECC) that is electrogalvanized sheet steel to ensure rigidity.

Figure 43:
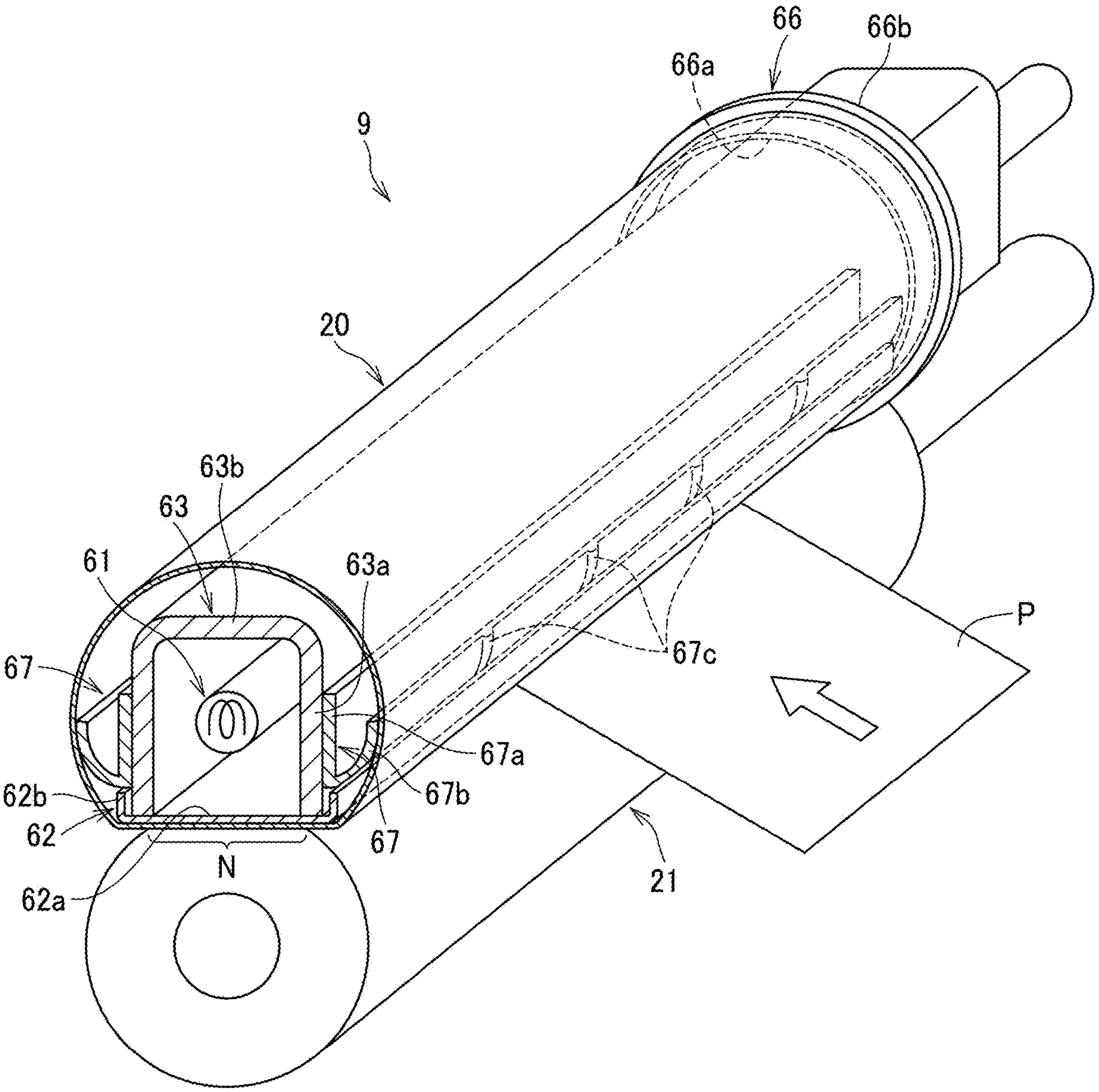
FIG. 43 is a perspective view of the fixing device with the schematic sectional view of the fixing device of FIG. 42.

The guides 67 are disposed inside the loop of the fixing belt 20 to guide the rotating fixing belt 20. In the present embodiment, the guides 67 are disposed on both the upstream side and the downstream side of the fixing nip N in the belt rotational direction. The guide 67 includes an attachment portion 67*a* fixed to the reflector 63 and a curved guide portion 67*b* in contact with the inner circumferential surface of the fixing belt 20. As illustrated in FIG. 43, the guide portion 67*b* includes a plurality of ribs 67*c* that are projections provided at equal intervals in the belt width direction on a guide surface of the guide portion 67*b* that is the surface facing the fixing belt 20. Guiding the fixing belt 20 along the guide surface having the plurality of ribs 67*c* enables smooth rotation of the fixing belt 20 without large deformation of the fixing belt 20.

The temperature sensor 64 may be either contact type or non-contact type. The temperature sensor 64 may be a known temperature sensor such as a thermopile, a thermostat, a thermistor, a non-contact (NC) sensor.

Figure 44:
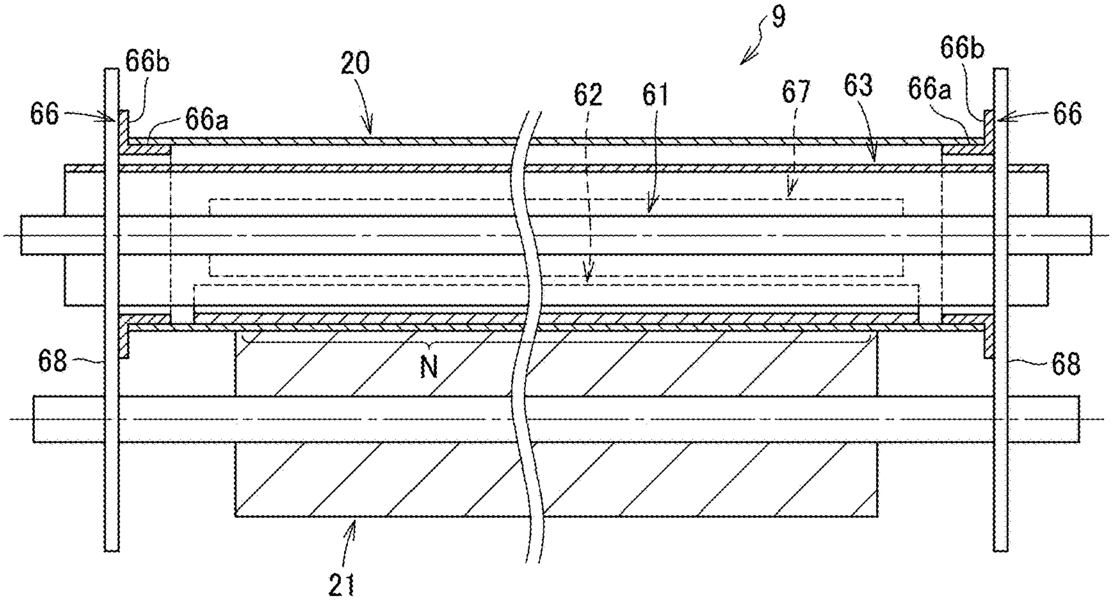
FIG. 44 is a front sectional view of the fixing device of FIG. 42.

As illustrated in FIG. 44, a pair of belt holders 66 is inserted into both ends of the fixing belt 20 to rotatably support the fixing belt 20. The pair of belt holders 66 is fixed to a pair of side plates 68 that is a part of a frame of the fixing device 9.

Figure 45:
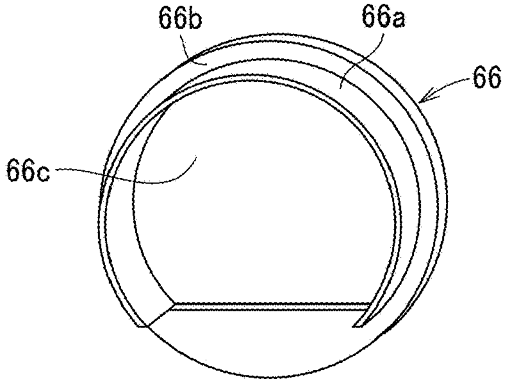
FIG. 45 is a perspective view of a belt holder.
Figure 46:
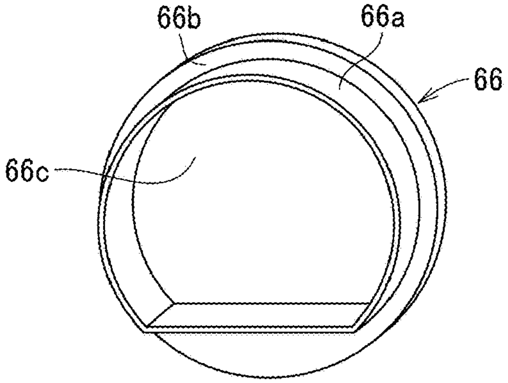
FIG. 46 is a perspective view of a variation of the belt holder.

As illustrated in FIG. 45, the belt holder 66 includes the C-shaped tube 66*a* and the flange 66*b*. The tube 66*a* is inserted into the loop of the fixing belt 20 to support the fixing belt 20. The belt holder 66 has an opening 66*c*, and both ends of the halogen heater 61 and both ends of the reflector 63 are fixed to the side plates 68 through openings 66*c* of the belt holders 66. The halogen heater 61 and the reflector 63 may be fixed to the belt holders 66. As illustrated in FIG. 46, the tube 66*a* may have a cylindrical shape which is continuous over its entire circumference.

Figure 47:
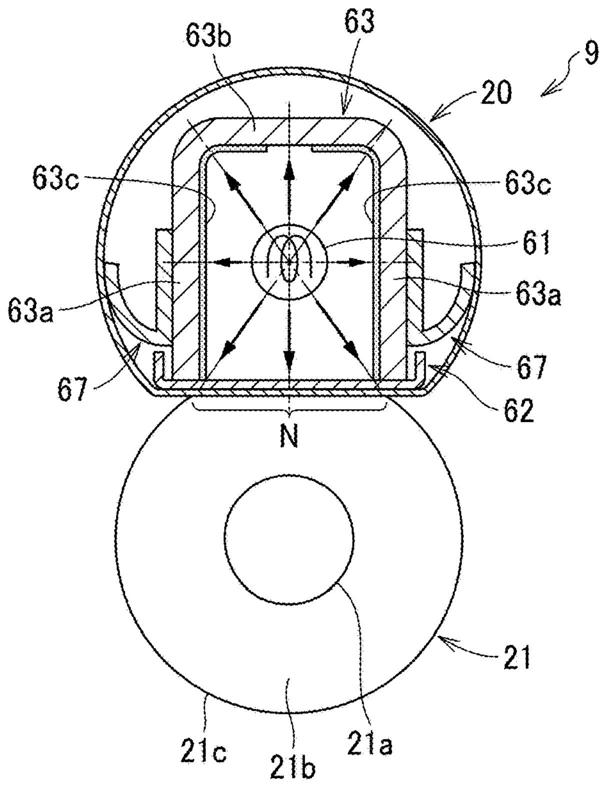
FIG. 47 is a schematic sectional view of the fixing device of FIG. 42, illustrating a reflection face of a reflector.

As illustrated in FIG. 47, a reflection face 63*c* is formed on the inner surface of the reflector 63 that is the surface facing the halogen heater 61 to reflect the radiant heat that is the infrared light from the halogen heater 61. In the present embodiment, the reflection face 63*c* is formed by applying reflective material on a base of the reflector 63 made of iron-type metal material. Alternatively, instead of applying the reflective material, the reflection face 63*c* may be formed by polishing the surface of the base of the reflector 63 that is the surface facing the halogen heater 61.

The reflection face in the present disclosure has a reflectance of 70% or more with respect to the infrared light from the heater. For example, the reflection face 63*c* has a reflectance of 70% or more with respect to light having a wavelength of 900 to 1600 nm, or a reflectance of 70% or more with respect to light having a wavelength of 1000 to 1300 nm, which are wavelengths of infrared light of the heater generally used in the fixing device. The reflectance may be measured by a known method using the spectrophotometer that is, for example, the ultraviolet visible infrared spectrophotometer UH4150 manufactured by Hitachi High-Tech Science Co., Ltd. in which the incident angle is set 5°.

The reflection face 63*c* formed on the reflector 63 as described above reflects the infrared light emitted from the halogen heater 61, and the reflected light irradiates the nip formation pad 62. As a result, the halogen heater 61 directly irradiates the nip formation pad 62 with the infrared light, and, additionally, the nip formation pad 62 is also irradiated with the infrared light reflected by the reflection face 63*c*. Therefore, the nip formation pad 62 is effectively heated. In addition, reflection of the infrared light by the reflection face 63*c* can prevent the reflector 63 from being heated and reduce waste of energy.

Additionally, in the present embodiment, since the reflector 63 functions as a support that supports the nip formation pad 62, a separate support is not needed. Setting the separate support needs forming the reflector thinly to dispose the reflector in a narrow space between the separate support and the halogen heater 61. Forming the reflector thinly results in a small thermal capacity of the reflector, and the temperature of the reflector is likely to increase. As a result, the temperature of the reflector becomes high in a short time, and the reflector may tarnish and reduce the reflectance. In contrast, the reflector 63 in the present embodiment having the function of the support enables making the thick reflector 63 having a large thermal capacity, which moderates temperature rise caused by the radiant heat from the halogen heater 61. Thereby, even if the halogen heater 61 is used continuously for a long time, the large thermal capacity can prevent the reflector 63 from becoming high temperature, tarnishing, and lowering the reflectance and maintain high heating efficiency.

The conductor 38 and the discharging brush 37 in the above-described embodiments may be applied to the fixing device in the embodiments illustrated in FIGS. 40 and 42. The common discharging brush 37 can remove the electric charge from both of the core and the surface layer. As a result, the above-described configuration can reduce the number of components of the fixing device, resulting in a reduction in the cost and the reduction in the size of the fixing device. In addition, the above-described configuration enables the discharging brush 37 to stably come into contact with the discharged member and stably remove the electric charges of the first layer and the third layer of the first rotator.

The present disclosure is not limited to applying the fixing device described in the above embodiments. The present disclosure may be applied to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to the above heating device enables the common discharger to remove the electric charge from the first layer and the third layer of the first rotator. In addition, the above-described configuration enables the discharger to stably come into contact with the discharged member and stably remove the electric charges of the first layer and the third layer of the first rotator.

The image forming apparatus according to the present embodiments of the present disclosure is applicable not only to the color image forming apparatus 100 illustrated in FIG. 1 but also to a monochrome image forming apparatus, a copier, a printer, a facsimile machine, or a multifunction peripheral including at least two functions of the copier, printer, and facsimile machine.

Figure 48:
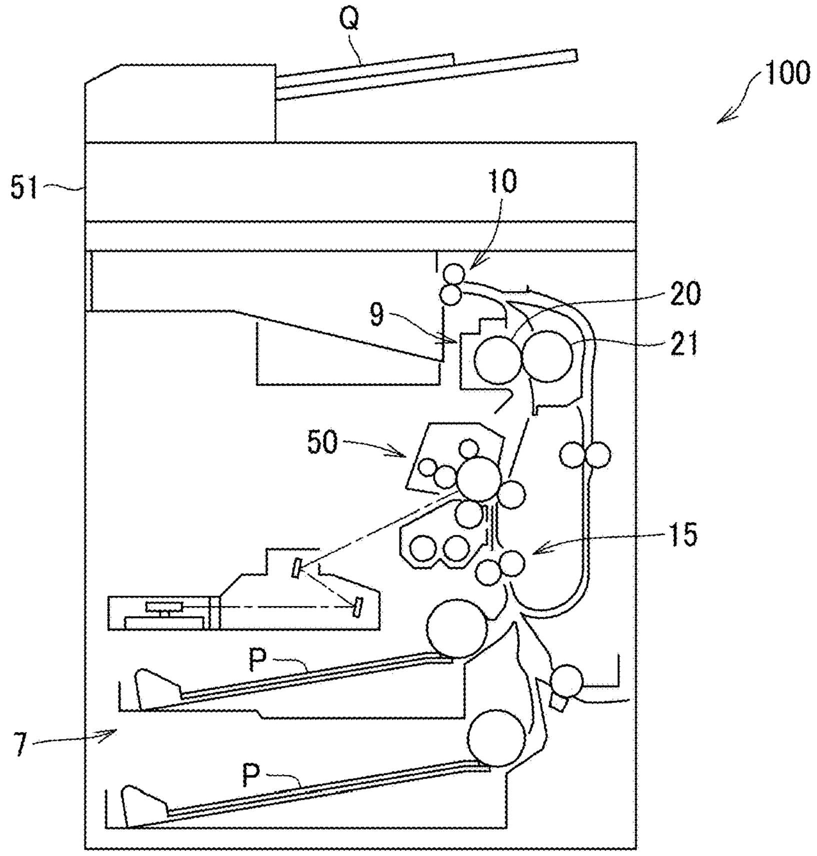
FIG. 48 is a schematic sectional view of a configuration of an image forming apparatus different from the image forming apparatus of FIG. 1.

For example, as illustrated in FIG. 48, the image forming apparatus 100 according to the present embodiment includes an image forming device 50 including a photoconductor drum and the like, the sheet conveyer including the timing roller pair 15 and the like, the sheet feeder 7, the fixing device 9, the sheet ejection device 10, and a reading device 51. The sheet feeder 7 includes the plurality of sheet feeding trays, and the sheet feeding trays stores sheets of different sizes, respectively.

The reading device 51 reads an image of a document Q. The reading device 51 generates image data from the read image. The sheet feeder 7 stores the plurality of sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q. The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing devices of the above-described embodiments is omitted as appropriate.

Figure 49:
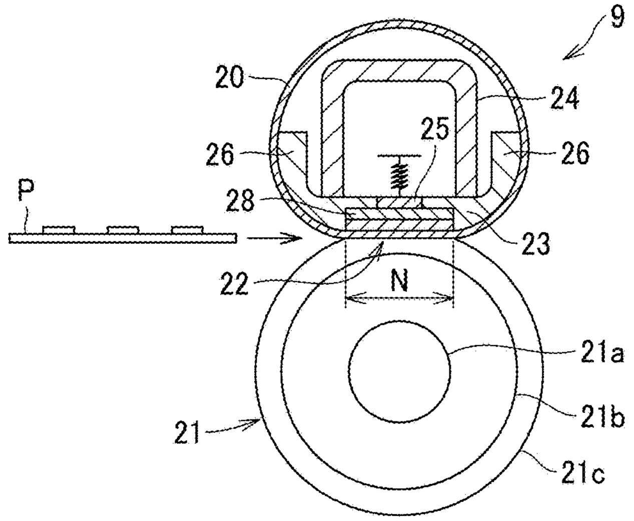
FIG. 49 is a schematic sectional view of the fixing device incorporated in the image forming apparatus of FIG. 48.

As illustrated in FIG. 49, the fixing device 9 includes the fixing belt 20, the pressure roller 21, the heater 22, the heater holder 23, the stay 24, the thermistors 25, and the first high thermal conduction member 28.

The fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the surface layer 21*c*. The pressure roller 21 has an outer diameter of 24 to 30 mm, and the elastic layer 21*b* has a thickness of 3 to 4 mm.

The heater 22 includes the base, the thermal insulation layer, a conductor layer including the resistive heat generator and the like, and the insulation layer, and is formed to have a thickness of 1 mm as a whole. A width Y of the heater 22 in the direction intersecting the arrangement direction is 13 mm.

Figure 50:
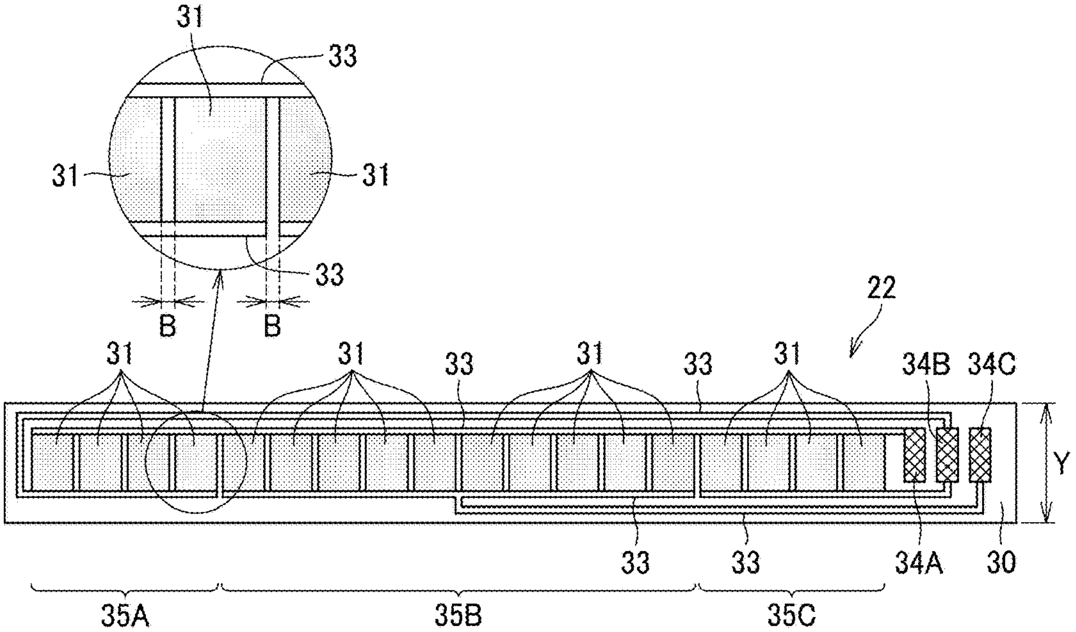
FIG. 50 is a plan view of the heater in the fixing device of FIG. 49.

As illustrated in FIG. 50, the conductor layer of the heater 22 includes a plurality of resistive heat generators 31, power supply lines 33A and 33B, and electrodes 34A to 34C. As illustrated in the enlarged view of FIG. 50, the separation area B is formed between neighboring resistive heat generators of the plurality of resistive heat generators 31 arranged in the arrangement direction. The enlarged view of FIG. 50 illustrates two separation areas B, but the separation area B is formed between neighboring the resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image onto the small sheet, the heat generation portion 35B generates heat. When the fixing device 9 fixes the toner image onto the large sheet, all the heat generation portions 35A to 35C generate heat.

Figure 51:
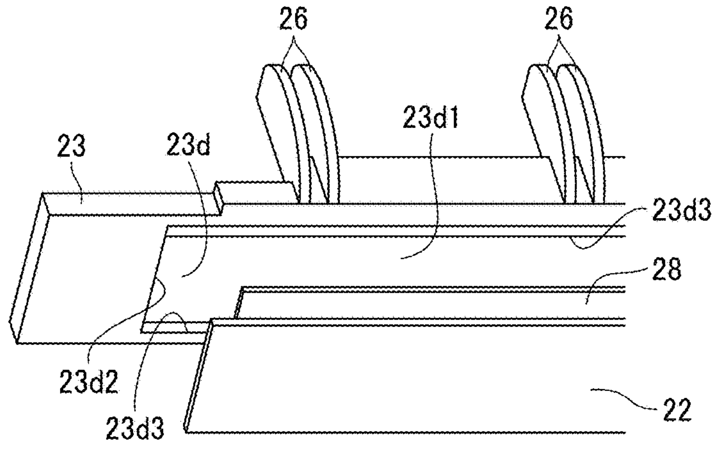
FIG. 51 is a partial perspective view of the heater and the heater holder in the fixing device of FIG. 49.

As illustrated in FIG. 51, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*d*1 and walls 23*d*2 and 23*d*3. The bottom surface 23*d*1 is substantially parallel to the base 30 and the surface recessed from the side of the heater holder 23 toward the stay 24. The walls 23*d*2 are both side surfaces of the recessed portion 23*d* in the arrangement direction. The recessed portion 23*d* may have one wall 23*d*2. The walls 23*d*3 are both side surfaces of the recessed portion 23*d* in the direction intersecting the arrangement direction. The heater holder 23 has guides 26. The heater holder 23 is made of liquid crystal polymer (LCP).

Figure 52:
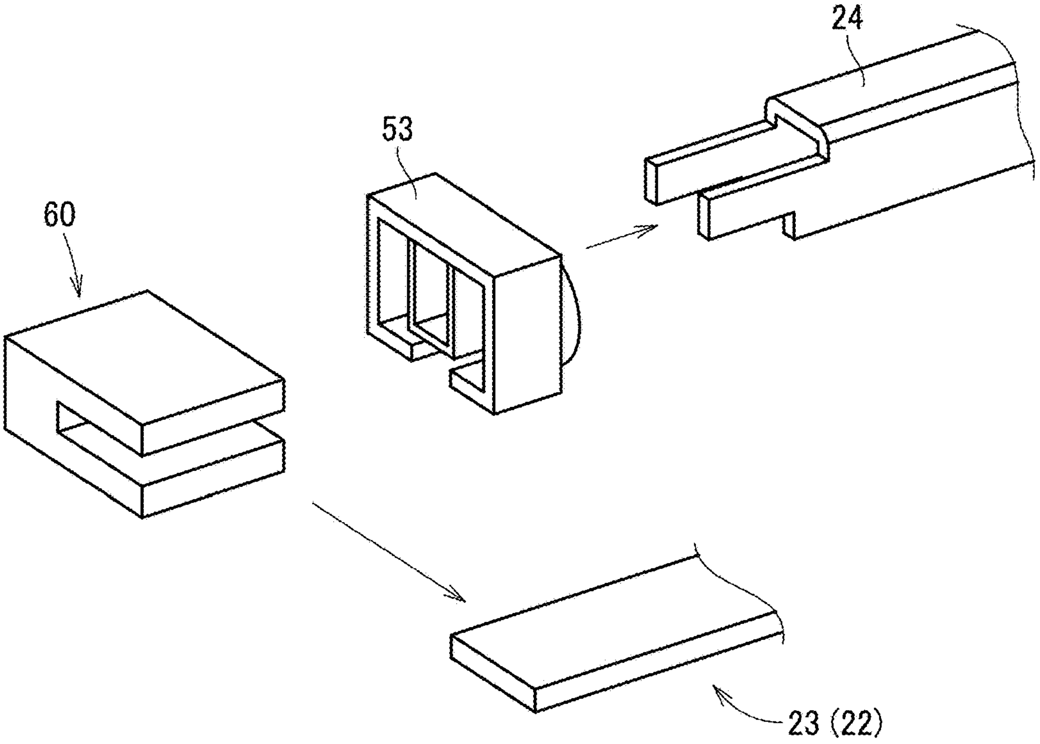
FIG. 52 is a perspective view of a connector attached to the heater.

As illustrated in FIG. 52, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically coupled to the power supply provided in the image forming apparatus via the connector 60. The above-described configuration enables the power supply to supply power to the heat generation portion 35. Note that at least a part of each of the electrodes 34A to 34C is not coated by the insulation layer and therefore exposed to secure connection with the connector 60.

A flange 53 contacts the inner circumferential surface of the fixing belt 20 at each of both ends of the fixing belt 20 in the arrangement direction to hold the fixing belt 20. The flange 53 is fixed to the housing of the fixing device 9. The flange 53 is inserted into each of both ends of the stay 24 (see an arrow direction from the flange 53 in FIG. 52).

To attach to the heater 22 and the heater holder 23, the connector 60 is moved in the direction intersecting the arrangement direction (see a direction indicated by arrow from the connector 60 in FIG. 52). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other and relatively move in the recessed portion to attach the connector 60 to the heater holder 23. The connector 60 is attached to one end of the heater 22 and one end of the heater holder 23 in the arrangement direction. The one end of the heater 22 and the one end of the heater holder 23 are farther from a portion in which the pressure roller 21 receives a driving force from a drive motor than the other end of the heater 22 and the other end of the heater holder 23, respectively.

Figure 53:
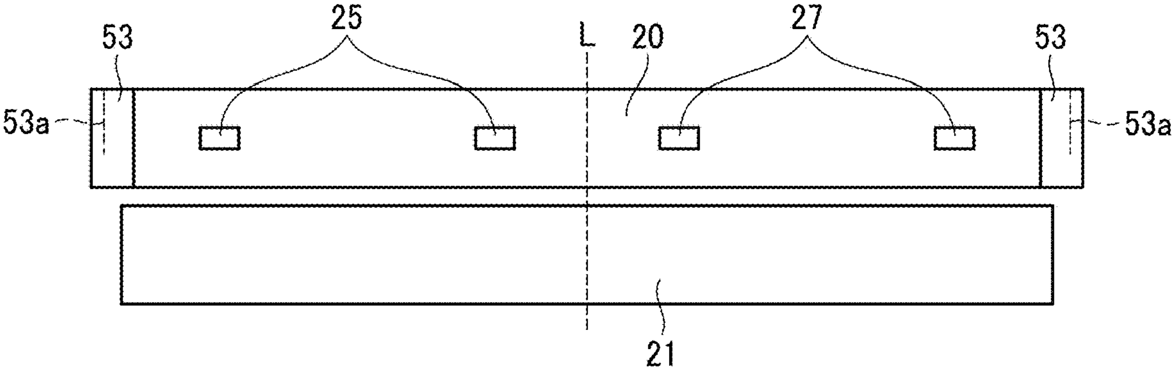
FIG. 53 is a schematic diagram illustrating an arrangement of thermistors and thermostats.

As illustrated in FIG. 53, one thermistor 25 faces a center portion of the inner circumferential surface of the fixing belt

20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25.

As illustrated in FIG. 52, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current flowing to the heater 22 in response to a detection of a temperature of the fixing belt 20 higher than a predetermined threshold value.

Flanges 53 are disposed at both ends of the fixing belt 20 in the arrangement direction and hold both ends of the fixing belt 20, respectively. The flange 53 is made of liquid crystal polymer (LCP).

Figure 54:
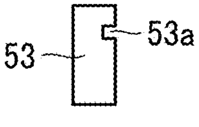
FIG. 54 is a schematic diagram illustrating a groove of a flange.

As illustrated in FIG. 54, the flange 53 has a slide groove 53*a*. The slide groove 53*a* extends in a direction in which the fixing belt 20 moves toward and away from the pressure roller 21. An engaging portion of the housing of the fixing device 9 is engaged with the slide groove 53*a*. The relative movement of the engaging portion in the slide groove 53*a* enables the fixing belt 20 to move toward and away from the pressure roller 21.

The conductor 38 and the discharging brush 37 in the above-described embodiments as illustrated in FIG. 3 and the like may also remove the electric charge from the pressure roller 21 as the first rotator in the above-described fixing device 9. The above-described configuration enables the common discharging brush 37 to remove the electric charge from both of the core 21*a* and the surface layer 21*c*. As a result, the above-described configuration can reduce the number of components of the fixing device, resulting in a reduction in the cost and the reduction in the size of the fixing device. In addition, the above-described configuration enables the discharging brush 37 to stably come into contact with the discharged member and stably remove the electric charges of the first layer and the third layer of the first rotator.

The above-described embodiments are illustrative and do not limit this disclosure. It is therefore to be understood that within the scope of the appended claims, numerous additional modifications and variations are possible to this disclosure otherwise than as specifically described herein.

The image forming apparatus according to the present embodiments of the present disclosure is applicable not only to the color image forming apparatus 100 illustrated in FIG. 1 but also to a monochrome image forming apparatus, a copier, a printer, a facsimile machine, or a multifunction peripheral including at least two functions of the copier, printer, and facsimile machine.

The sheets P serving as recording media may be thick paper, postcards, envelopes, plain paper, thin paper, coated paper, art paper, tracing paper, overhead projector (OHP) transparencies, plastic film, prepreg, copper foil, and the like.

In the above-described embodiments, the discharging brush as the discharger is described, but the discharger in the present disclosure is not limited to the discharging brush. For example, an appropriate configuration such as a sheet-shaped discharger may be used as the discharger.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A fixing device comprising:
a first rotator including:
a first layer being electrically conductive;
a second layer not being electrically conductive; and
a third layer being electrically conductive;
the first layer, the second layer, and the third layer existing in an order of the first layer, the second layer, and the third layer from a center of the first rotator to an outside of the first rotator;
a second rotator forming a nip between the first rotator and the second rotator, the nip through which a recording medium bearing a toner image passes;
a heater disposed inside a loop of the second rotator and configured to heat the second rotator;
a conductor being in contact with one of the first layer and the third layer; and
a discharger being in contact with the conductor and the other one of the first layer and the third layer, the discharger configured to remove electric charge from the first rotator.

2. The fixing device according to claim 1,
wherein the conductor is in contact with the third layer and has a contacted portion to be brought into contact with the discharger, and
wherein the contacted portion is in a region from an outer surface of the third layer to an outer surface of the first layer in a radial direction of the first rotator.

3. The fixing device according to claim 2,
wherein the first layer has an exposed portion having an outer surface exposed to an outside of the first rotator,
wherein the exposed portion includes a first exposed portion and a second exposed portion, and
wherein the first exposed portion is in contact with the discharger and longer than the second exposed portion in the radial direction of the first rotator.

4. The fixing device according to claim 3,
wherein a position of an outer surface of the first exposed portion in the radial direction of the first rotator is same as a position of the contacted portion of the conductor in the radial direction.

5. The fixing device according to claim 1,
wherein the conductor is in contact with the first layer and has a contacted portion to be brought into contact with the discharger, and
wherein the contacted portion is outside an outer surface of the first layer in a radial direction of the first rotator.

6. The fixing device according to claim 5,
wherein the contacted portion of the conductor and at least one of an outer surface of the third layer or a surface of the second rotator are at a same position in the radial direction.

7. The fixing device according to claim 1,
wherein the conductor is in contact with the first layer, and
wherein an outer diameter of the conductor is smaller than an outer diameter of the first rotator.

8. The fixing device according to claim 7,
wherein the conductor is not in contact with the second rotator.

9. The fixing device according to claim 1,
wherein the conductor is in contact with the first layer, wherein the conductor has lengths in a radial direction of the first rotator that are different in a circumferential direction of the first rotator, and wherein the conductor is configured to come into contact with the second rotator in a partial region in the circumferential direction.

10. The fixing device according to claim 1, wherein the conductor is in contact with the first layer, and wherein a contact area in which the conductor contacts an end of the first rotator in an axial direction of the first rotator is equal to or less than one third of an area of a cross section of the first rotator, the cross section being orthogonal to the axial direction of the first rotator.

11. The fixing device according to claim 1, wherein the conductor is in contact with the first layer, and wherein the conductor includes a plurality of projections in contact with the first rotator, the plurality of projections projecting in an axial direction of the first rotator.

12. The fixing device according to claim 1, wherein the conductor is made of an elastic material.

13. The fixing device according to claim 1, further comprising a connector configured to supply power to the heater and disposed opposite the conductor with respect to a center of the fixing device in a longitudinal direction of the fixing device.

14. The fixing device according to claim 1, further comprising a thermal conduction member on the heater, wherein the discharger is in contact with the thermal conduction member.

15. The fixing device according to claim 14, wherein the thermal conduction member includes graphene.

16. An image forming apparatus comprising the fixing device according to claim 1.

17. A fixing device comprising:

a first rotator including:

a first layer being electrically conductive;

a second layer not being electrically conductive; and a third layer being electrically conductive;

the first layer, the second layer, and the third layer existing in an order of the first layer, the second layer, and the third layer from a center of the first rotator to an outside of the first rotator;

a second rotator forming a nip between the first rotator and the second rotator, the nip through which a recording medium bearing a toner image passes;

a heater disposed inside a loop of the second rotator and configured to heat the second rotator;

a conductor being in contact with the first layer; and a discharger being in contact with the conductor and a surface layer of the second rotator, the discharger configured to remove electric charge from the first rotator.

18. An image forming apparatus comprising the fixing device according to claim 17.

19. A fixing device comprising:

a first rotator including:

a first layer being electrically conductive;

a second layer not being electrically conductive; and a third layer being electrically conductive;

the first layer, the second layer, and the third layer existing in an order of the first layer, the second layer, and the third layer from a center of the first rotator to an outside of the first rotator;

a second rotator forming a nip between the first rotator and the second rotator, the nip through which a recording medium bearing a toner image passes;

a heater disposed inside a loop of the second rotator and configured to heat the second rotator;

a conductor being in contact with the first layer and the third layer; and a discharger being in contact with at least one of the first layer, the third layer, the conductor, or a surface layer of the second rotator.

20. An image forming apparatus comprising the fixing device according to claim 19.

* * * * *